United States Patent
Miroshnikov et al.

(10) Patent No.: US 12,002,258 B2
(45) Date of Patent: Jun. 4, 2024

(54) SYSTEM AND METHOD FOR MITIGATING BIAS IN CLASSIFICATION SCORES GENERATED BY MACHINE LEARNING MODELS

(71) Applicant: Discover Financial Services, Riverwoods, IL (US)

(72) Inventors: Alexey Miroshnikov, Evanston, IL (US); Konstandinos Kotsiopoulos, Easthampton, MA (US); Arjun Ravi Kannan, Buffalo Grove, IL (US); Raghu Kulkarni, Buffalo Grove, IL (US); Steven Dickerson, Deerfield, IL (US)

(73) Assignee: Discover Financial Services, Riverwoods, IL (US)

( * ) Notice: Subject to any disclaimer, the term of this patent is extended or adjusted under 35 U.S.C. 154(b) by 650 days.

(21) Appl. No.: 16/891,989

(22) Filed: Jun. 3, 2020

(65) Prior Publication Data
US 2021/0383268 A1    Dec. 9, 2021

(51) Int. Cl.
*G06V 10/82*    (2022.01)
*G06F 17/16*    (2006.01)
(Continued)

(52) U.S. Cl.
CPC ............ *G06V 10/82* (2022.01); *G06F 17/16* (2013.01); *G06F 18/23* (2023.01); *G06N 20/00* (2019.01); *G06V 10/774* (2022.01); *G06V 10/776* (2022.01)

(58) Field of Classification Search
None
See application file for complete search history.

(56) References Cited

U.S. PATENT DOCUMENTS 8,370,253 B1    2/2013  Grossman
11,030,583 B1*  6/2021  Garg .................. G06N 20/00
(Continued)

FOREIGN PATENT DOCUMENTS

WO    2021/074491 A1    4/2021

OTHER PUBLICATIONS

Wasserstein Fair Classification, Jiang et al., arXiv:1907.12059v1 [stat. ML] Jul. 28, 2019, Proceedings of the Thirty-Fifth Conference on Uncertainty in Artificial Intelligence, 2019.*

(Continued)

*Primary Examiner* — David J Stoltenberg
(74) *Attorney, Agent, or Firm* — Lee Sullivan Shea & Smith LLP

(57) ABSTRACT

A method, system, and computer-readable medium are disclosed for detecting and mitigating bias in a trained machine learning model. The method includes the steps of: training the model based on a training data set; detecting bias in the model relative to a protected class; identifying one or more groups of input variables that contribute to the bias; and mitigating bias in the model. Mitigating the bias is performed by constructing a post-processed score function that either (a) neutralizes or partially neutralizes one or more groups of input variables in the input vector of the model, or (b) utilizes a fair score approximation of the model to project the distributions for the protected class and/or the unprotected class to substantially match. In an embodiment, detecting bias in the trained model is performed by comparing distribution for two or more subpopulations based on a distance metric, such as a Wasserstein distance.

20 Claims, 7 Drawing Sheets

(51) Int. Cl.
   *G06F 18/23*   (2023.01)
   *G06N 20/00*   (2019.01)
   *G06V 10/774*  (2022.01)
   *G06V 10/776*  (2022.01)

(56) References Cited

U.S. PATENT DOCUMENTS

| | | | | |
|---|---|---|---|---|
| 2014/0229415 | A1* | 8/2014 | Martineau | G06N 20/00 706/46 |
| 2018/0285685 | A1 | 10/2018 | Singh et al. | |
| 2019/0188605 | A1* | 6/2019 | Zavesky | G06N 20/00 |
| 2019/0279111 | A1 | 9/2019 | Merrill et al. | |
| 2019/0378210 | A1* | 12/2019 | Merrill | G06N 5/02 |
| 2020/0081865 | A1* | 3/2020 | Farrar | G06K 9/6218 |
| 2020/0082299 | A1* | 3/2020 | Vasconcelos | G06N 20/00 |
| 2020/0184350 | A1* | 6/2020 | Bhide | G06N 5/045 |
| 2020/0218987 | A1 | 7/2020 | Jiang et al. | |
| 2020/0302309 | A1* | 9/2020 | Golding | G06N 5/04 |
| 2020/0311486 | A1* | 10/2020 | Dey | G06N 5/04 |
| 2020/0320428 | A1* | 10/2020 | Chaloulos | G06N 20/00 |
| 2020/0372035 | A1* | 11/2020 | Tristan | G06K 9/6265 |
| 2020/0372304 | A1* | 11/2020 | Kenthapadi | G06N 7/01 |
| 2020/0372406 | A1* | 11/2020 | Wick | G06N 20/00 |
| 2020/0380398 | A1* | 12/2020 | Weider | G06F 16/285 |
| 2020/0410129 | A1* | 12/2020 | Nadler | G06F 21/6245 |
| 2021/0133870 | A1* | 5/2021 | Kamkar | G06N 7/01 |
| 2021/0158102 | A1* | 5/2021 | Lohia | G06F 18/214 |
| 2021/0174222 | A1* | 6/2021 | Dodwell | G06F 16/285 |
| 2021/0224605 | A1* | 7/2021 | Zhang | G06N 20/00 |
| 2021/0241033 | A1* | 8/2021 | Yang | G06K 9/6257 |
| 2021/0248503 | A1* | 8/2021 | Hickey | G06V 10/809 |
| 2021/0256832 | A1* | 8/2021 | Weisz | G10L 25/51 |
| 2021/0334654 | A1* | 10/2021 | Himanshi | G06N 3/0427 |
| 2021/0350272 | A1 | 11/2021 | Miroshnikov et al. | |
| 2022/0036203 | A1* | 2/2022 | Nachum | G06N 20/00 |

OTHER PUBLICATIONS

Optimized Score Transformation for Consistent Fair Classication, Wei et al., arXiv:1906.00066v3 [cs.LG] Oct. 29, 2021.*
FAE: A Fairness-Aware Ensemble Framework, Iosifidis et al., arXiv:2002.00695v1 [cs.AI] Feb. 3, 2020, 978-1-7281-0858-2/19/ $31.00 © 2019 IEEE.*
Recovering from Biased Data: Can Fairness Constraints Improve Accuracy?; Blum et al., arXiv:1912.01094v1 [cs.LG] Dec. 2, 2019.*
Fairness in Machine Learning with Tractable Models, Varley et al., arXiv:1905.07026v2 [cs.LG] Jan. 13, 2020.*
Fairness by Explicability and Adversarial SHAP Learning, Hickey et al. arXiv:2003.05330v3 [cs.LG] Jun. 26, 2020.*
Bias Mitigation Post-Processing for Individual and Group Fairness, Lohia et al., 978-1-5386-4658-8/18/$31.00 © 2019 IEEE.*
AI Fairness 360: An extensible toolkit for detecting and mitigating algorithmic bias, Bellamy et al., IBM J. Res. & Dev. vol. 63 No. 4/5 Paper 4 Jul./Sep. 2019.*
Dwork et al., "Fairness Through Awareness" *Proceedings of the 3rd Innovations in Theoretical Computer Science Conference*, 214-226 (2012).
Feldman et al., "Certifying and Removing Disparate Impact" Proceedings of the 21th ACM SIGKDD International Conference on Knowledge Discovery and Data Mining, 259-268 (2015).
Hardt et al., "Equality of Opportunity in Supervised Learning" *Advances in Neural Information Processing Systems*, 3315-3323 (2015).
Lundberg et al., "A Unified Approach to Interpreting Model Predictions" *31st Conference on Neural Information Processing Systems* (2017).
Thorpe, Matthew, *Introduction to Optimal Transport*, University of Cambridge (2018).
Bergstra et al. Algorithms for Hyper-Parameter Optimization. NIPS 11: Proceedings of the 24th International Conference on Neural Information Processing Systems Dec. 2011, 9 pages.
Balashankar et al. Pareto-Efficient Fairness for Skewed Subgroup Data. In the International Conference on Machine Learning AI for Social Good Workshop. vol. 8. Long Beach, United States, 2019, 8 pages.
Del Barrio et al. Obtaining fairness using optimal transport theory. arXiv preprint arXiv:1806.03195v2. Jul. 19, 2018, 25 pages.
Hall et al. A United States Fair Lending Perspective on Machine Learning. Frontiers in Artificial Intelligence. doi:10.3389/frai.2021. 695301, Jun. 7, 2021, 9 pages.
Perrone et al. Fair Bayesian Optimization. AIES '21, May 19-21, 2021, Virtual Event, USA. pp. 854-863.
Dwork et al. Generalization in Adaptive Data Analysis and Holdout Reuse. NIPS'15: Proceedings of the 28th International Conference on Neural Information Processing Systems, vol. 2, Dec. 2015, 9 pages.
Hashimoto et al. Fairness Without Demographics in Repeated Loss Minimization. In ICML, 2018, 10 pages.
Karush, William. Minima of Functions of Several Variables with Inequalities as Side Constraints. A Dissertation Submitted to the Faculty of the Division of the Physical Sciences in Candidacy for the Degree of Master in Science. Department of Mathematics. University of Chicago. Dec. 1939, 29 pages.
Kuhn et al. Nonlinear programming. In Proceedings of the Second Berkeley Symposium on Mathematical Statistics and Probability. Berkeley, Calif. University of California Press. 90. 1951, pp. 481-492.
Lahoti et al. Fairness without Demographics through Adversarially Reweighted Learning. arXiv preprint arXiv:2006.13114. 2020, 13 pages.
Miroshinikov et al. Wasserstein-based fairness interpretability framework for machine learning models. arXiv:2011.03156v1. Nov. 6, 2020, 34 pages.
Pareto. Optimality. In: Multiobjective Linear Programming. Springer International Publishing. DOI 10.1007/978-3-319-21091-9_4. 2016, pp. 85-118.
Markowitz, Harry. Portfolio Selection. The Journal of Finance. vol. 7, No. 1. 1952, pp. 77-91.
Rawls, John. Justice as Fairness: A Restatement. Harvard University Press. 2001, 32 pages.
Schmidt et al. An Introduction to Artificial Intelligence and Solutions to the Problems of Algorithmic Discrimination. arXiv preprint arXiv:1911.05755. vol. 73, No. 2. 2019, pp. 130-144.
Villani, Cedric. Optimal Transport, Old and New. Springer. Jun. 13, 2008, 998 pages.
Jiang et al. Smooth Isotonic Regression: A New Method to Calibrate Predictive Models. AMIA Joint Summits on Translational Science proceedings. 2011, pp. 16-20.
Bousquet et al. Stability and Generalization. Journal of Machine Learning Research 2. Mar. 2002, pp. 499-526.
Miroshnikov et al. Mutual Information-based group explainers with coalition structure for machine learning model explanations. Computer Science and Game Theory. arXiv:2102.10878v1. Feb. 22, 2021, 46 pages.
Kearns et al. Algorithmic Stability and Sanity-Check Bounds for Leave-One-Out Cross-Validation. Neural Computation, vol. 11, No. 6. 1999, pp. 1427-1453.
Aas et al. Explaining Individual Predictions When Features are Dependent: More Accurate Approximations to Shapley Values. arXiv preprint arXiv:1903.10464v3, Feb. 6, 2020, 28 pages.
Banzhaf III. Weighted Voting Doesn't Work: A Mathematical Analysis. Rutgers Law Review, vol. 19, No. 2, 1965, 28 pages.
Barocas et al. Fairness and Machine Learning: Limitations and Opportunities. [online], 253 pages, 1999 [retrieved online on May 26, 2022]. Retrieved from the Internet:<URL:https://fairmlbook. org/>.
Chen et al. True to Model or True to the Data? arXiv preprint arXiv:2006.1623v1, Jun. 29, 2020, 7 pages.
Cover et al. Elements of Information Theory. A John Wiley & Sons, Inc., Publication. Second Edition, 2006, 774 pages.
Del Barrio et al. On Approximate Validation of Models: A Kolmogorov-Smirnov Based Approach. arXiv:1903.08687v1, Mar. 20, 2019, 32 pages.

(56) References Cited

OTHER PUBLICATIONS

Dickerson et al. Machine Learning. Considerations for fairly and transparently expanding access to credit. 2020, 29 pages [online]. Retrieved online: URL<https://info.h2o.ai/rs/644-PKX-778/images/Machine%20Learning%20-%20Considerations%20for%20Fairly%20and%20Transparently%20Expanding%20Access%20to%20Credit.pdf>.

Equal Employment Opportunity Act. 2 pages [online]. Retrieved online: URL<https://www.dol.gov/sites/dolgov/files/ofccp/regs/compliance/posters/pdf/eeopost.pdf>.

Fair Housing Act (FHA). FDIC Law, Regulations, Related Actions, 3 pages [online]. Retrieved online: URL< https://www.ecfr.gov/current/title-12/chapter-III/subchapter-B/part-338.

Equal Credit Opportunity Act (ECOA). FDIC Law, Regulations, Related Actions, 9 pages [online]. Retrieved online: URL< https://www.fdic.gov/regulations/laws/rules/6000-1200.html>.

Lorenzo-Freire, Silvia. New characterizations of the Owen and Banzhaf-Owen values using the intracoalitional balanced contributions property. Department of Mathematics. 2017, 23 pages.

Friedman, Jerome. 1999 Reitz Lecture. Greedy Function Approximation: A Gradient Boosting Machine. Annals of Statistics, vol. 29, No. 6. 2001, pp. 1189-1232.

Goldstein et al. Peeking Inside the Black Box: Visualizing Statistical Learning with Plots of Individual Conditional Expectation. arXiv:1309.6392v2J. Mar. 20, 2014, 22 pages.

Hall, Patrick. On the Art and Science of Explainable Machine Learning: Techniques, Recommendations, and Responsibilties. KDD '19 XAI Workshop. arXiv preprint arxiv:1810.02909, Aug. 2, 2019, 10 pages.

Hastie et al. The Elements of Statistical Learning: Data Mining, Interference, and Prediction. Springer. Second edition, Jan. 13, 2017, 764 pages.

Heller et al. A consistent multivariate test of association based on ranks of distances. Biometrika. arXiv:1201.3522v1. Jan. 17, 2012, 14 pages.

Heller et al. Consistent Distribution-Free K-Sample and Independence Tests for Univariate Random Variables. Journal of Machine Learning Research. vol. 17, No. 29. Feb. 2016, 54 pages.

Janzing et al. Feature relevance quantification in explainable AI: A causal problem. arXiv preprint arXiv:1910.13413v2. Nov. 25, 2019, 11 pages.

Jiang et al. Identifying and Correcting Label Bias in Machine Learning. Proceedings of the 23rd International Conference on Artificial Intelligence and Statistics (AISTATS). 2020, 10 pages.

Kamiran et al. Data Preprocessing Techniques for Classification Without Discrimination. Knowl. Inf. Syst. DOI 10.1007/s10115-011-0463-8. Dec. 3, 2011, 33 pages.

Kamiran et al. Discrimination Aware Decision Tree Learning. 2010 IEEE International Conference on Data Mining. doi: 10.1109/ICDM.2010.50. 2010, pp. 869-874.

Kamiran et al. Classifying without Discriminating. 2009 2nd International Conference on Computer, Control and Communication. doi: 10.1109/IC4.2009.4909197. 2009, pp. 1-6.

Kamishima et al. Fairness-Aware Classifier with Prejudice Remover Regularizer. Proceedings of the European Conference on Machine Learning and Principles and Practice of Knowledge Discovery in Databases (ECMLPKDD), Part II. 2012, pp. 35-50.

Koralov et al. Theory of Probability and Random Processes. Second Edition. Springer. 1998, 349 pages.

Kovalev et al. A robust algorithm for explaining unreliable machine learning survival models using the Kolmogorov-Smirnov bounds. Neural Networks. arXiv:2005.02249v1, May 5, 2020. pp. 1-39.

Lipovetsky et al. Analysis of regression in game theory approach. Applied Stochastic Models Business and Industry. vol. 17. Apr. 26, 2001, pp. 319-330.

Lundberg et al. Consistent Individualized Feature Attribution for Tree Ensembles. arXiv preprint arxiv:1802.03888v3. Mar. 7, 2019, 9 pages.

Owen, Guillermo. Values of Games with a Priori Unions. In: Essays in Mathematical Economics and Game Theory. Springer, 1977, pp. 76-88.

G. Owen. Modification of the Banzhaf-Coleman index for Games with a Priori Unions. Power, Voting and Voting Power. 1981, pp. 232-238.

Ribeiro et al. "Why Should I Trust You?" Explaining the Predictions of Any Classifier. 22nd Conference on Knowledge Discovery and Data Mining, San Francisco, CA. arXiv:1602.04938v3. Aug. 9, 2016, 10 pages.

Reshef et al. Detecting Novel Associations in Large Data Sets. Science, vol. 334. Dec. 2011, pp. 1518-1524.

Reshef et al. An Empirical Study of Leading Measures of Dependence. arXiv preprint arXiv:1505.02214. May 12, 2015, 42 pages.

Reshef et al. Measuring Dependence Powerfully and Equitably. Journal of Machine Learning Research, vol. 17. 2016, 63 pages.

Royden et al. Real Analysis. Boston: Prentice Hall, 4th Edition. 2010, 516 pages.

Santambrogio, Filippo. Optimal Transport for Applied Mathematicians. Calculus of Variations, PDEs and Modeling. Springer. May 2015, 356 pages.

Shapley, L.S. A Value for n-Person Games. Annals of Mathematics Studies. 1953, 13 pages.

Shiryaev, A.N. Probability. Springer, Second Edition. 1980, 22 pages.

Shorack et al. Empirical Processes with Applications to Statistics. Wiley, New York. 1986, 36 pages.

Strumbelji et al. Explaining prediction models and individual predictions with feature contributions. Springer. Knowledge Information System, vol. 41, No. 3. 2014, pp. 647-665.

Szekely et al. Measuring and Testing Dependence by Correlation of Distances. The Annals of Statistics, vol. 35, No. 6. ArXiv:0803.4101v1, Mar. 28, 2008, 26 pages.

Sundararajan et al.The Many Shapley Values for Model Explanation. arXiv preprint arXiv:1908.08474v1, Aug. 22, 2019, 9 pages.

Zemel et al. Learning Fair Representations. Proceedings of the 30th International Conference on Machine Learning, PMLR vol. 28, No. 3. 2013, pp. 325-333.

Zhang et al. Mitigating Unwanted Biases with Adversarial Learning. In Proceedings of the 2018 AAAI/ACM Conference on AI, Ethics, and Society. Feb. 2-3, 2018, pp. 335-340.

Young. Monotonic Solutions of Cooperative Games International Journal of Game Theory, vol. 14, Issue 2. 1985. 8 pages.

Wasserman et al. All of Statistics: A Concise Course in Statistical Inference. Springer Texts in Statistics. 2004, 14 pages.

Woodworth et al. Learning Non-Discriminatory Predictors. Proceedings of Machine Learning Research, vol. 65, No. 1-34. 2017, 34 pages.

Miroshinikov et al. Model-agnostic bias mitigation methods with regressor distribution control for Wasserstein-based fairness metrics. arXiv:2111.11259v1. Nov. 19, 2021, 29 pages.

Zhao et al. Causal Interpretations of Black-Box Models. J Bus., Econ. Stat., DOI:10.1080/07350015.2019.1624293, 2019, 16 pages.

International Search Report and Written Opinion issued in International Application No. PCT/US2022/029670, dated Sep. 7, 2022, 10 pages.

Explainable Artificial Intelligence (xAI), Defense Advanced Research Projects Agency, DARPA-BAA-16-53 (2016).

Manu Joseph. Interpretability Cracking open the black box—Part 111. Machine Learning. Deep & Shallow, Nov. 24, 2019-Dec. 30, 2020, 29 pages.

Krivoruchko et al. Using Multivariate Interpolation for Estimating Well Performance, Esri.com, Arcuser. Esri Technology Summer 2014, 13 pages. URL:<URL: https://www.esri.com/abouUnewsroom/arcuser/using-multivariate-interpolation-for-estimating-well-performance/>.

Chen et al. Comparison and Improvement of the predictability and interpretability with ensemble learning models in QSPR applications. Journal of Cheminformatics, Mar. 30, 2020, 50 pages. <URL:https://jcheminf.biomedcentral.com/articles/10.1186/s13321-020-0417-9>.

Ding et. al. Comparisons of Two Ensemble Mean Methods in Measuring the Average Error Growth and the Predictability. The

(56) References Cited

OTHER PUBLICATIONS

Chinese Meteorological Society and Springer-Verlag Berlin Heidelberg, No. 4, vol. 25, Mar. 21, 2011, pp. 395-404 <URL:https://www.researchgate.net/publication/253261791>.

Hu et. al. Locally Interpretable Models and Effects based on Supervised Partitioning, Wells Fargo, Jun. 1, 2018, 15 pages <URL: https://arxiv.org/pdf/1806.00663>.

Abduljabbar et al., "Applications of Artificial Intelligence in Transport: An Overview," Sustainability (2019).

Albizuri et al. On Coalitional Semivalues. Games and Economic Behavior 49, Nov. 29, 2002, 37 pages.

Alonso-Meijide et al. Modification of the Banzhaf Value for Games with a Coalition Structure. Annals of Operations Research, Jan. 2002, 17 pages.

Amer et al. The modified Banzhaf value for games with coalition structure: an axiomatic characterization. Mathematical Social Sciences 43, (2002) 45-54, 10 pages.

Apley et al., "Visualizing the Effects of Predictor Variables in Black Box Supervised Learning Models," Ar Xiv (2016).

Aumann et al. Cooperative Games with Coalition Structure. International journal of Game Theory, vol. 3, Issue 4, Jul. 1974, pp. 217-237.

Aurenhammer et al., Voronoi Diagrams And Delaunay Triangulations, pp. 7-13, 41-45, New Jersey, World Scientific Publishing (2013).

Breiman et al. Estimating Optimal Transformations for Multiple Regression and Correlation. Journal of the American Statistical Association. vol. 80, No. 391, Sep. 1985, 19 pages.

Bzdok et al., "Statistics Versus Machine Learning," Nature Methods, vol. 15, 233-234 (Apr. 2018).

Casas-Mendez et al. An extension of the tau-value to games with coalition structures. European Journal of Operational Research, vol. 148, 2003, pp. 494-513.

Dubey et al. Value Theory Without Efficiency. Mathematics of Operations Research. vol. 6, No. 1. 1981, pp. 122-128.

Eggleston, H.G., Convexity, pp. 33-38, Cambridge University Press (1958).

Elshawi et al. On the interpretability of machine learning-based model for predicting hypertension. BMC Medical Informatics and Decision Making. vol. 19, No. 146. 2019, 32 pages.

FDIC Title VII—Equal Credit Opportunity, FDIC Law, Regulations, Related Acts—Consumer Protection (Dec. 31, 2019).

Gretton et al. A Kernel Statistical Test of Independence. In Advances in Neural Information Processing Systems. 2007, 8 pages.

Gretton et al. A Kernel Two-Sample Test. The Journal of Machine Learning Research. vol. 13, No. 1. Mar. 2012, pp. 723-773.

Gretton et al. Measuring Statistical Dependence with Hilbert-Schmidt Norms. In Algorithmic Learning Theory. Springer-Verlag Berlin Heidelberg. 2005, pp. 63-77.

Hall et al. An Introduction to Machine Learning Interpretability, O'Reilly, Second Edition, Aug. 2019, 62 pages.

Hoeffding, Wassily. A Non-Parametric Test of Independence. The Annals of Mathematical Statistics. 1948, pp. 546-557.

Iosifidis et al. FAE: A Fairness-Aware Ensemble Framework, IEEE, arXiv:2002.00695v1 [cs.AI] Feb. 3, 2020, 6 pages. <URL:https://arxiv.org/abs/2002.00695>.

Ji et al. Post-Radiotherapy PET Image Outcome Prediction by Deep Learning Under Biological Model Guidance: A Feasibility Study of Oropharyngeal Cancer Application. Duke University Medical Center. arXiv preprint. 2021, 26 pages.

Jiang et al. Nonparametric K-Sample Tests via Dynamic Slicing. Journal of the American Statistical Association. Harvard Library. Sep. 11, 2015. pp. 642-653.

Jiang et al. Wasserstein Fair Classification. Proceedings of the Thirty-Fifth Conference on Uncertainty in Artificial Intelligence, arXiv:1907.12059v1 [stat.ML] Jul. 28, 2019, 15 pages. <URL: chrome-extension://efaidnbmnnnibpcajpcglclefindmkaj/http://proceedings.mlr.press/v115/jiang20a/jiang20a.pdf>.

Jollife et al. Principal Component Analysis. Springer Series in Statistics. Second Edition, 2002, 518 pages.

Kamijo, Yoshio. A two-step Shapley value in a cooperative game with a coalition structure. International Game Theory Review. 2009, 11 pages.

Kraskov et al. Estimating mutual information. The American Physical Society. Physical Review E vol. 69. Jun. 23, 2004, 16 pages.

Leo Breiman. Statistical Modeling: The Two Cultures. Statistical Science, vol. 16, No. 3, 2001, pp. 199-231.

Leo et al., "Machine Learning in Banking Risk Management: A Literature Review," Risks (2019).

Lopez-Paz et al. The Randomized Dependence Coefficient. In Advances in Neural Information Processing Systems. 2013, pp. 1-9.

Lundberg, Scott. Welcome to SHAP Documentation. 2018, 46 pages [online]. Retrieved online URL:< https://shap.readthedocs.io/en/latest/>.

Modarres et al. Towards Explainable Deep Learning for Credit Lending: A Case Study. arxiv:1811.06471v2, Nov. 11, 2018, 8 pages.

Paninski, Liam. Estimation of Entropy and Mutual Information. Neural Computation, vol. 15, No. 6. 2003, pp. 1191-1253.

Renyi. On Measures of Dependence. Acta mathematica hungarica, vol. 10, No. 3.1959, pp. 441-451.

SAS/STAT User's Guide, Version 8, Chapter 68 "The VARCLUS Procedure" (1999).

Szekely et al. Brownian Distance Covariance. The Annals of Applied Statistics, vol. 3, No. 4. 2009. 31 pages.

Tibshirani et al. Estimating the number of clusters in a dataset via the gap statistic. Journal of the Royal Statistical Society, Series B. vol. 63, Part 2. 2001. pp. 411-423.

Tijs. Bounds for the Core and the Tau-Value. Game Theory and Mathematical Economics. 1981, pp. 123-132.

Vanderbei, Robert J. Linear Programming: Foundations and Extensions, 4th ed., pp. 11-16, 141-144, New York, NY, Springer Science and Business Media (2014).

Vaughan et al., "Explainable Neural Networks based on Additive Index Models," Corporate Model Risk, Wells Fargo, USA (Jun. 2018).

Vidal-Puga, Juan. The Harsanyi paradox and the "right to talk" in bargaining among coalitions. Mathematical Social Sciences. vol. 64. Mar. 27, 2012. 32 pages.

Wang et al. Shapley Flow: A Graph-based Approach to Interpreting Model PredictionsarXiv preprint arXiv:2010.14592, 2020, 11 pages.

Wehle et al., "Machine Learning, Deep Learning, and AI: What's the Difference?" Data Scientist Innovation Day (2017).

Wei et al. Optimized Score Transformation for Consistent Fair Classication, arXiv:1906.00066v3 [cs.LG] Oct. 29, 2021, 78 pages <URL: chrome-extension://efaidnbmnnnibpcajpcglclefindmkaj/https://arxiv.org/pdf/1906.00066.pdf>.

Wuest et al., "Machine Learning in Manufacturing: Advantages, Challenges and Applications, " Production and Manufacturing Research, vol. 4, 23-45 (2016).

Zeng et al. Jackknife approach to the estimation of mutual information. PNAS, vol. 115, No. 40. Oct. 18, 2018. 6 pages.

Manu Joseph. Interpretability Cracking open the black box—Part 11. Machine Learning. Deep & Shallow, Nov. 16, 2019-Nov. 28, 2019, 23 pages.

\* cited by examiner

SYSTEM AND METHOD FOR MITIGATING BIAS IN CLASSIFICATION SCORES GENERATED BY MACHINE LEARNING MODELS

TECHNICAL FIELD

The present disclosure relates to machine learning. More specifically, the embodiments set forth below describe systems and methods for mitigating bias in machine learning models.

BACKGROUND

Financial services corporations, like in many other industries, are incorporating machine learning (ML) models into their business practices. Certain ML models can be utilized for the purposes of marketing or soliciting consumers to purchase or subscribe to services that are subject to a fair lending review under the Equal Credit Opportunity Act (ECOA). An important aspect of the fair lending review is evaluating models utilized in delivery of those services for potential fail lending bias. For example, certain variables utilized by a model, such as mortgage variables, may be highly correlated to race, which in turn might disproportionately impact model scores for a particular protected class.

Currently, the ECOA recognizes three types of protected classes: age, gender, and race/ethnicity. The current process for conducting a fair lending review includes an initial review of all variables included in the input to an algorithm. While age of the consumer was typically provided in the input, gender and race were not available and, therefore, were inferred based on a methodology such as Bayesian Improved Surname Geocoding (BISG). When the algorithm comprises a logistic regression algorithm, for example, a correlation of each variable with each of these three other variables could be evaluated and high correlation results in mitigation efforts such as reducing weights associated with the highly correlated variable in the input.

However, as more complex ML models are utilized within the industry, it becomes more difficult to track the importance of individual variables on the behavior of the ML model. Further, more complex ML models typically incorporate a much larger number of variables in the input than traditional algorithms. Thus, there is a need for addressing these issues and/or other issues associated with the prior art.

SUMMARY

A method, computer readable medium, and system are disclosed for mitigating bias in unfair classifiers. Bias in the trained model is detected by comparing distributions for different subpopulations (e.g., an unprotected class and one or more protected classes) using a distance metric. If the bias is above a threshold value, then the bias is mitigated by constructing a post-processed score function that at least partially neutralizes one or more groups of input variables contributing to the bias or by constructing a fair score approximation of the model and then projecting the distributions of the trained score based on a joint probability of the predictors and the protected attributes.

In a first aspect of the present disclosure, a method is disclosed for detecting and mitigating bias in a trained machine learning model. The method includes the steps of: training, by the one or more processors, a model based on a training data set, detecting bias in the model relative to a protected class, identifying one or more groups of input variables that contribute to the bias, and mitigating bias in the model.

In some embodiments, detecting bias in the model comprises comparing distributions for two or more subpopulations in the training data set based on a Wasserstein distance metric. Each subpopulation of the two or more subpopulations includes a set of instances of an input vector corresponding to a particular protected attribute. In an embodiment, the bias is separated into a positive bias and a negative bias.

In some embodiments, identifying one or more groups of input variables that contribute to the bias comprises: separating the input variables in the input vector into groups of one or more input variables based on a clustering algorithm, calculating, for each group of one or more input variables, a bias contribution value based on a quantile function, and ranking the groups of one or more input variables according to the bias contribution values. In an embodiment, the quantile function is based on a group partial dependence plot (PDP) metric. In another embodiment, the quantile function is based on a Shapley Additive Explanation (SHAP) metric.

In some embodiments, mitigating bias in the model comprises constructing a post-processed score function. In an embodiment, the post-processed score function neutralizes at least one group of input variables that contribute to the bias. In another embodiment, the post-processed score function partially neutralizes at least one group of input variables that contribute to the bias by applying a transformation to each input variable in the at least one group of input variables. In an embodiment, the transformation comprises compressing the distribution of the input variable towards a median value for the input variable in a set of input vectors included in the training data set. After the post-processed score function has been constructed, in an embodiment, the post-processed score function is calibrated using logistic or isotonic calibration.

In some embodiments, the post-processed score function is based on a fair score approximation for the model. In an embodiment, the fair score approximation is generated based on the joint distribution of a set of input vectors in the training data set and a corresponding set of protected attributes. After the post-processed score function has been constructed, in an embodiment, the post-processed score function is calibrated using logistic or isotonic calibration.

In another aspect of the present disclosure, a system for mitigating bias in a model is disclosed. The system includes a memory and one or more processors coupled to the memory. The one or more processors are configured to: train the model based on a training data set, detect bias in the model relative to a protected class, identify one or more groups of input variables that contribute to the bias, and mitigate bias in the model. The detection, identification, and mitigation can be performed by a bias detection engine, a bias explanation engine, and a bias mitigation engine, respectively.

In some embodiments, identifying one or more groups of input variables that contribute to the bias comprises: separating the input variables in the input vector into groups of one or more input variables based on a clustering algorithm; calculating, for each group of one or more input variables, a bias contribution value based on a quantile function of a score explainer function; and ranking the groups of one or more input variables according to the bias contribution values. In one embodiment, the score explainer function is based on a group partial dependence plot (PDP) metric.

In some embodiments, mitigating bias in the model comprises constructing a post-processed score function that at least partially neutralizes at least one group of input variables that contribute to the bias. In other embodiments, mitigating bias in the model comprises constructing a fair score approximation for the model. The fair score approximation is generated based on the joint distribution of a set of input vectors in the training data set and a corresponding set of protected attributes.

In yet another aspect of the present disclosure, a non-transitory computer-readable media storing computer instructions is disclosed. The instructions, when executed by one or more processors, cause the one or more processors to perform the steps comprising: training, by the one or more processors, a model based on a training data set; detecting bias in the model relative to a protected class; identifying one or more groups of input variables that contribute to the bias; and mitigating bias in the model.

DETAILED DESCRIPTION

Figure 1:
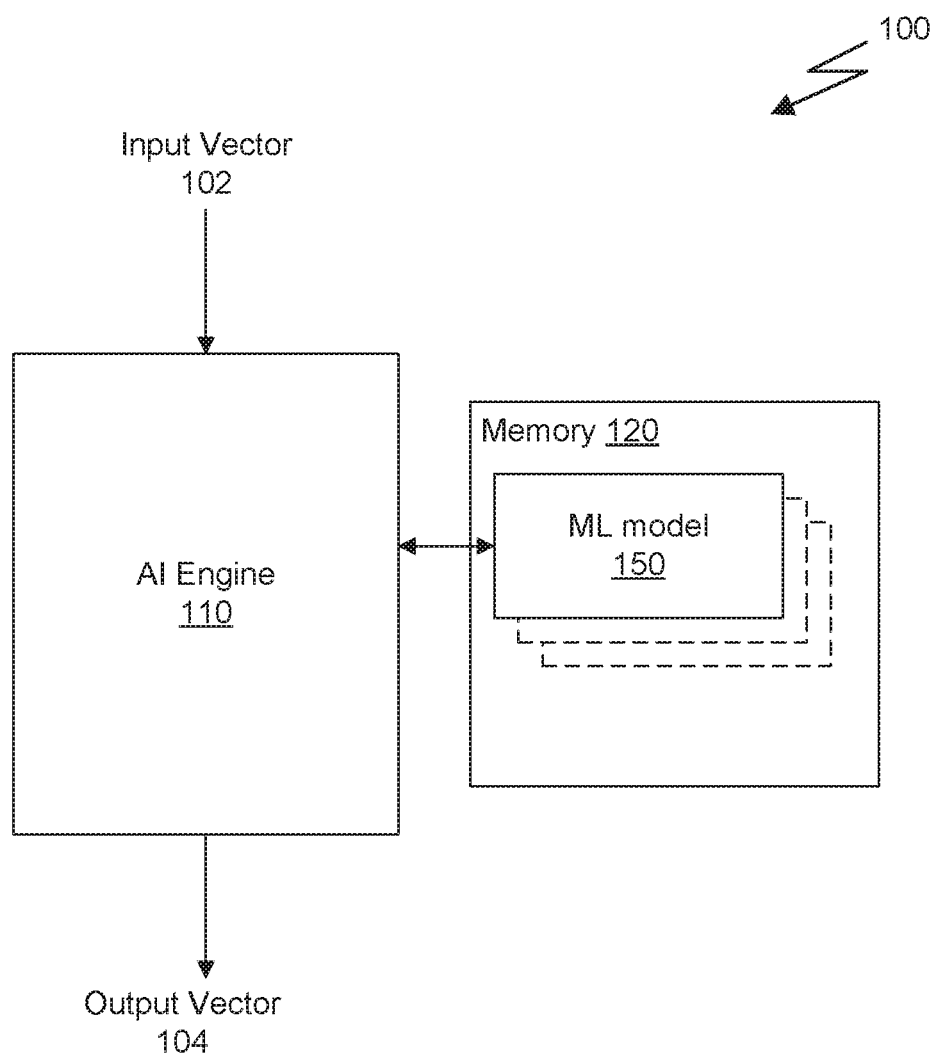
FIG. 1 illustrates a system for processing data with a machine learning model, in accordance with some embodiments.

A collection of tools are disclosed for: measuring bias in a trained model according to one or more metrics; evaluating the model to explain the contribution of each group of predictors to the model bias; and mitigating the bias. The first step in the process includes selecting a metric to use for measuring the bias in the trained model. The metric can include either the Wasserstein distance or the Kolmogorov-Smirnov distance to evaluate a difference between distributions of scores for each protected class and the remainder of the population. The metric value can be compared against a threshold value to determine if the model exhibits bias beyond an acceptable level.

The second step in the process is performed if the model bias exceeds the threshold value. In such cases, the model is evaluated to explain the contribution to the bias from each of the groups of predictors. Model interpretability techniques such as partial dependence plots (PDP) or Shapley Additive Explanations (SHAP) can be employed to determine the contribution level of each grouped predictor to the score bias (equivalently, to the model bias). The bias contribution level for each grouped predictor can be separated into two values: a positive bias and a negative bias. When using the Wasserstein metric, the positive bias is defined as an integrated classifier bias that favors the unprotected class, and the negative bias is defined as an integrated classifier bias that favors the protected class. For the Kolmogorov-Smirnov metric, the positive bias is defined as the maximal classifier bias that favors the unprotected class, and the negative bias is defined as the maximal classifier bias that favors the protected class. The bias explanation engine provides an explanation for how each group of predictors contributes to the model bias, and allows for both a visualization of the results as well as a ranked order of the results for different groups of predictors. For example, where a model exhibits a bias disfavoring Hispanic populations over White populations, the bias explanation engine can produce a rank of all model attributes (e.g., groups of predictors) by contributions to the differences in outcome of the model.

The final step in the process is utilized to select a mitigation strategy. In one approach to mitigation, the bias of the model can be mitigated by neutralizing or partially neutralizing certain predictors or groups of predictors before processing the predictors for a new sample with the model. Neutralization refers to replacing certain predictors in the input for a sample with neutral values (e.g., median or mean values for a population). Partial neutralization refers to replacing certain predictors with a scaled value for the predictor, as defined by a transformation. In another approach to mitigation, the model can be approximated with an intermediate or auxiliary model that is constructed based on a joint distribution of predictors and protected attributes. Once this model is constructed, the approximation of the fair score can then be projected onto a space of predictors.

It is well-known that treatment of data or post-processing the score function to achieve fairness decreases the predictive accuracy of the model. This can be referred to as a fairness-utility tradeoff. In order to be able to compare post-processed scores and assess the efficiency of the above methodologies, a bias-performance model plot and a bias-performance classifier plot can be utilized. The plots allow for visualization of the bias of the post-processed scores and classifier and can aid in choosing an appropriate post-processed model from the efficient frontier of models on the plot.

FIG. 1 illustrates a system 100 for processing data with a machine learning model, in accordance with some embodiments. As depicted in FIG. 1, the system 100 includes an AI engine 110 coupled to a memory 120. In one embodiment, the AI engine 110 comprises a processor configured to implement one or more ML models 150 stored in the memory 120. The processor can be a central processing unit (CPU), a parallel processing unit (PPU), a system on a chip (SoC) that includes one or more CPU cores and one or more graphics processing unit (GPU) cores, or the like. The memory 120 can be a volatile memory such as dynamic random access memory (DRAM) or the like. In some embodiments, the memory 120 can include a non-volatile memory such as a hard disk drive (HDD), solid state drive (SSD), Flash memory, or the like. The non-volatile memory can be used as a backing store for the volatile memory.

In some embodiments, each ML model 150 can refer to a set of instructions designed to implement a specific ML algorithm. In some instances, the ML algorithm can comprise a linear or logistic regression algorithm. In other instances, the ML algorithm can comprise a neural network such as a CNN or RNN, as well as tree-based methods such as Random Forests or Gradient Boosting Machines. It will be appreciated that the ML model 150 can be designed to be one of a wide range of ML algorithms, including regression algorithms, neural networks, tree-based algorithms, and the like.

In some embodiments, the AI engine 110 is configured to receive an input vector 102. The input vector 102 can be a one-dimensional array of scalar values, each scalar value representing an input variable. In other embodiments, the input vector 102 can be d-dimensional where d is at least two. For example, the input vector 102 could represent a plurality of one dimensional sample vectors collected at different points of time such that the input vector 102 is a matrix of scalar values. In other embodiments, the input vector 102 is an image (e.g., a two-dimensional array of pixel values). Each pixel value can be, e.g., a scalar value or a tuple of scalar values (such as RGB values). Each pixel value can also represent various concepts such as the color of object in a scene, a depth of objects in a scene, a temperature of objects in a scene, or the like.

The AI engine 110 loads a particular ML model 150 from the memory 120 and processes the input vector 102 by the ML model 150. The ML model 150 generates an output vector 104. The output vector 104 can comprise a single scalar value, a one-dimensional vector that includes a plurality of scalar values, or a d-dimensional hypersurface. In an embodiment, the output vector 104 represents a classifier. For example, the output of a particular ML model 150 could contain a number of scalar values in a one-dimensional vector, where each value corresponds to a probability that the entity described by the input vector 102 corresponds to a particular class associated with that index of the output vector 104.

In one embodiment, the ML model 150 is a classifier for making a decision that is subject to fair lending review under the ECOA. The classifier can generate an output vector 104 that includes a single Boolean value (e.g., $Y \in \{0,1\}$). A first output, such as Y=0, is indicative of a favorable outcome and a second output, such as Y=1, is indicative of an adverse outcome. In order to comply with the ECOA, the fair lending review is conducted to ensure that there is no undue adverse effect from the model as applied to a protected class of individuals.

Figure 2:
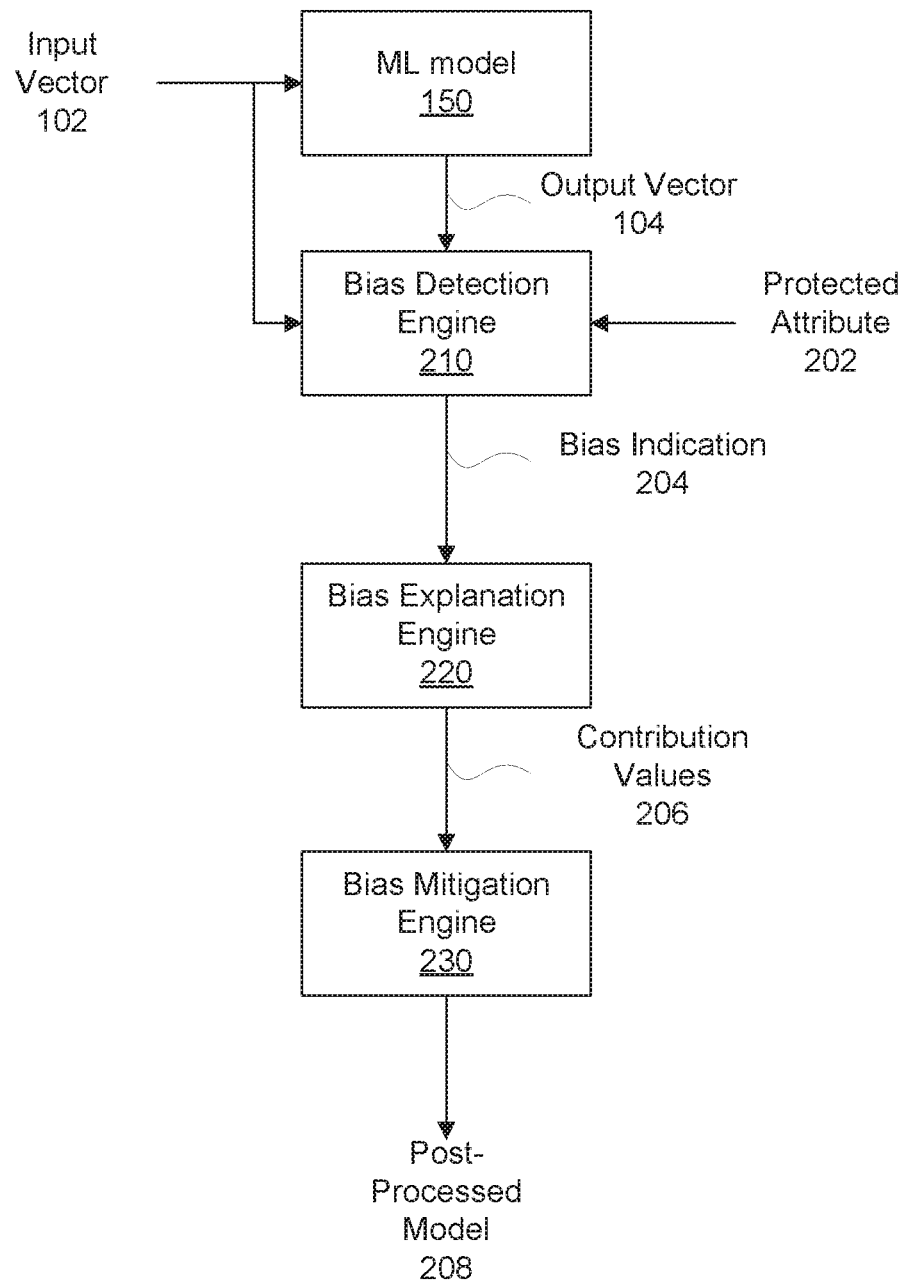
FIG. 2 illustrates a system for evaluating a trained model, in accordance with some embodiments.

FIG. 2 illustrates a system 200 for evaluating a trained ML model 150, in accordance with some embodiments. The system 200 includes a number of tools for evaluating the ML model 150, the tools including at least a bias detection engine 210, a bias explanation engine 220, and a bias mitigation engine 230. In an embodiment, the tools can be incorporated into the AI engine 110 and run after the ML model 150 is trained. In other embodiments, the tools can be implemented on a different device that has access to the trained ML model 150.

As depicted in FIG. 2, the bias detection engine 210 evaluates the ML model 150 to detect unfair bias in the trained classifier. In an embodiment, the ML model 150 defines a score function that is used in conjunction with a threshold to construct a classifier. The score function evaluates a set of input variables and generates a score (e.g., a scalar value) that is compared to the threshold value. Based on the comparison of the score with the threshold value, the classifier output is set to a Boolean value.

When undesired biases concerning demographic groups are included in the training data, then a well-trained ML model 150 will reflect those biases. As used herein, a data set can be described by the triplet (X, Y, G), where $X=(X_1, X_2, \ldots, X_p)$ is the set of predictors (e.g., the input variables processed by the ML model), $G \in \{0,1\}$ is the protected attribute, and $Y \in \{0,1\}$ is the label (e.g., the output generated by the ML model based on the input). Although the classifiers Y are described herein are binary, in other embodiments, the techniques used herein can be applied to classifiers with three or more classes (e.g., $Y=\{0, 1, \ldots, M-1\}$).

In an embodiment, the unprotected class can be defined as G=0 and the protected class can be defined as G=1. The label Y=1 corresponds to an adverse action and the label Y=0 corresponds to a favorable outcome. As used herein, $f(X)=\mathbb{P}(Y=1|X)$ is the true score function; $\hat{f}(X)=\hat{\mathbb{P}}(F=1|X)$ is the trained score function; $\tilde{f}(X)=\mathcal{P}[\hat{f}](X)$ is the post-processed score function; $\hat{Y}=\hat{Y}(X)$ is the classifier that has been trained on the training data (X,Y); and $\hat{Y}_t=\hat{Y}_t(X)=\{\hat{f}(X)>t\}$ is the classifier based on the trained score function $\hat{f}$ and threshold t. The integral notation $\int$ is used to denote the Lebesgue integral.

The protected class, G=1, can refer to individuals that have an age greater than or equal to 62, whose gender is female, or whose race/ethnicity is non-white, for example. In some embodiments, a classifier fairness metric is defined by comparing the probability of a positive outcome within different subsets of the data set. In other words, a probability of the protected class to have a favorable outcome can be compared to a probability of an unprotected class to have a favorable outcome. More specifically, a classifier $\hat{Y}$ satisfies demographic parity for a protected attribute G when:

$$\mathbb{P}(\hat{Y}=0|G=0)=\mathbb{P}(\hat{Y}=0|G=1) \quad \text{(Eq. 1)}$$

Demographic parity can be restated as requiring that the proportion of samples classified as favorable outcome versus adverse outcome is the same for both the protected class and the unprotected class. Another definition of classifier fairness can be referred to as equalized odds. The classifier $\hat{Y}$ satisfies equalized odds when:

$$\mathbb{P}(\hat{Y}=0|Y=y,G=0)=\mathbb{P}(\hat{Y}=0|Y=y,G=1), y \in \{0,1\} \quad \text{(Eq. 2)}$$

Equalized odds requires the classifier to have the same misclassification error rates for each class of the protected attribute and the label Y. Yet another definition of fairness can be referred to as equal opportunity. The classifier $\hat{Y}$ satisfies equal opportunity when:

$$\mathbb{P}(\hat{Y}=0|Y=0,G=0)=\mathbb{P}(\hat{Y}=0|Y=0,G=1), y \in \{0,1\} \quad \text{(Eq. 3)}$$

Equal opportunity requires the classifier to have the same misclassification error rate for each class but only for the favorable outcome. These three definitions of fairness are incompatible with each other. In some embodiments, only the definition of demographic parity is adopted to define the bias of the classifier.

In practice, perfect demographic parity rarely is met by a trained classifier. Thus, the level of bias of the classifier can be defined in terms of a difference between the probability of a favorable outcome for the unprotected class and the probability of a favorable outcome for the protected class. More specifically, given that the favorable outcome is associated with the label Y=0 and the unprotected class is defined as G=0, the signed classifier bias $\tilde{B}(\hat{Y})$ and the classifier bias $B(\hat{Y})$ of a classifier $\hat{Y}$ are defined as:

$$\tilde{B}(\hat{Y})=\mathbb{P}(\hat{Y}=0|G=0)-\mathbb{P}(\hat{Y}=0|G=1), B(\hat{Y})=|\tilde{B}(\hat{Y})| \quad \text{(Eq. 4)}$$

The positive classifier bias is defined as:

$$B_+(\hat{Y})=\max(0,\tilde{B}(\hat{Y})), \quad \text{(Eq. 5)}$$

and the negative classifier bias is defined as:

$$B_-(\hat{Y})=\max(0,-\tilde{B}(\hat{Y})), \quad \text{(Eq. 6)}$$

The signed classifier bias and classifier bias can be expressed as:

$$\tilde{B}(\hat{Y})=B_+(\hat{Y})-B_-(\hat{Y}), B(\hat{Y})=B_+(\hat{Y})+B_-(\hat{Y}) \quad \text{(Eq. 7)}$$

Although the above definition assumes that the protected attribute includes only two classes (e.g., $G=\{0,1\}$), in other embodiments, the protected attribute can include several classes (e.g., $G=\{0, 1, 2, \ldots K-1\}$). Such embodiments can define the classifier bias by considering pairwise couplings of any two classes of the protected attribute, and weighted average bias is defined relative to the unprotected class by averaging, with weights, all the pairwise biases of the protected classes relative to the unprotected class.

In one embodiment, the bias determination engine 210 is configured to evaluate the ML model 150 using a difference in distributions of scores between classes within the data set. The difference can be computed using either the Wasserstein or the Kolmogorov-Smirnov (KS) distance to compare distributions of scores for the two subsets corresponding to the protected vs. unprotected class. Given a trained score function $\hat{f}$, the model bias is determined by measuring the probabilistic distance between the two distributions:

$$\mathcal{B}(\hat{f}(X)G;d) = d(\hat{f}(X)|G=0, \hat{f}(X)|G=1), \quad \text{(Eq. 8)}$$

where d is any metric that measures the distance between two distributions. In an embodiment, the metric d is defined as the Wasserstein ($W_1$) distance given as:

$$d_{W_1}(\hat{f}|G=0, \hat{f}|G=1) = \int_0^1 |F_0^{-1}(p) - F_1^{-1}(p)| dp, \quad \text{(Eq. 9)}$$

where $F_k$ stands for a subpopulation cumulative distribution function (CDF) of the trained score function $\hat{f}$:

$$F_k(t) = \mathbb{P}(\hat{f}(X) < t | G = k), k = \{0, 1\}, \quad \text{(Eq. 10)}$$

and $F_k^{-1}$ is the corresponding quantile function. In practice, the CDF $F_k$ is replaced with its statistical estimate, the empirical CDF $\hat{F}_k$, which can be computed as:

$$\hat{F}_k(t) = \frac{1}{n_k} \sum_{(x,g) \in (X,G)} \mathbb{1}_{\{\hat{f}(x) < t, g = k\}}, \; n_k = \sum_{g \in G} \mathbb{1}_{\{g = k\}} \quad \text{(Eq. 11)}$$

Given the trained score function $\hat{f}$ and a collection of classifiers $\hat{Y}_t = \mathbb{1}_{\{\hat{f}(x) > t\}}$, it can be shown that a model bias based on the Wasserstein distance can be computed as an integral of the classifier bias over the set of all thresholds, recited as follows:

$$\mathcal{B}_{W_1}(\hat{f}|G) = d_{W_1}(\hat{f}|G=0, \hat{f}|G=1) = \int_{\mathbb{R}} B(\hat{Y}_t) dt \quad \text{(Eq. 12)}$$

In another embodiment, the metric d is defined as the Kolmogorov-Smirnov (KS) distance, which is given as:

$$d_{KS}(\hat{f}(X)|G=0, \hat{f}(X)|G=1) = \sup_{t \in R} |F_0(t) - F_1(t)| \quad \text{(Eq. 13)}$$

Given the trained score function $\hat{f}$ and a collection of classifiers $\hat{Y}_t = \mathbb{1}_{\{\hat{f}(x) > t\}}$, it can be shown that the model bias based on the Kolmogorov-Smirnov distance can be computed as the maximum (e.g., supremum) bias for the collection of classifiers across all thresholds, recited as follows:

$$\mathcal{B}_{KS}(\hat{f}(X)|G) = d_{KS}(\hat{f}(X)|G=0, \hat{f}(X)|G=1) = \sup_{t \in \mathbb{R}} \mathcal{B}(\hat{Y}_t) \quad \text{(Eq. 14)}$$

Given the unprotected class label is G=0 and the favorable outcome label is T=0, the set of all order values can be expressed as the disjoint unit:

$$[0,1] = \mathcal{P}_+ \cup \mathcal{P}_- \cup \mathcal{P}_0, \quad \text{(Eq. 15)}$$

where:

$$\mathcal{P}_+ = \{p : F_0^{-1}(p) < F_1^{-1}(p)\}, \quad \text{(Eq. 16)}$$

$$\mathcal{P}_- = \{p : F_0^{-1}(p) > F_1^{-1}(p)\}, \quad \text{(Eq. 17)}$$

$$\mathcal{P}_0 = \{p : F_0^{-1}(p) = F_1^{-1}(p)\} \quad \text{(Eq. 18)}$$

This disaggregation enables the model bias to be expressed as the sum of the positive model bias and the negative model bias:

$$\mathcal{B}_{W_1}(\hat{f}|G) = \mathcal{B}_{W_1}^+(\hat{f}|G) + \mathcal{B}_{W_1}^-(\hat{f}|G), \quad \text{(Eq. 19)}$$

where:

$$\mathcal{B}_{W_1}^+(\hat{f}|G) = \int_{\mathcal{P}_+} F_1^{-1}(p) - F_0^{-1}(p) dp, \quad \text{(Eq. 20)}$$

$$\mathcal{B}_{W_1}^-(\hat{f}|G) = \int_{\mathcal{P}_-} F_0^{-1}(p) - F_1^{-1}(p) dp \quad \text{(Eq. 21)}$$

Similarly, the set of thresholds can be expressed as the following disjoint union:

$$\mathbb{R} = \mathcal{T}_+ \cup \mathcal{T}_- \cup \mathcal{T}_0, \quad \text{(Eq. 22)}$$

where:

$$\mathcal{T}_+ = \{t : F_0(t) > F_1(t)\}, \quad \text{(Eq. 23)}$$

$$\mathcal{T}_- = \{t : F_0(t) < F_1(t)\}, \quad \text{(Eq. 24)}$$

$$\mathcal{T}_0 = \{t : F_0(t) = F_1(t)\} \quad \text{(Eq. 25)}$$

It can be shown that the positive bias and the negative bias satisfy:

$$\mathcal{B}_{W_1}^+(\hat{f}|G) = \int_{\mathcal{T}_+} B(\hat{Y}_t) dt, \quad \text{(Eq. 26)}$$

$$\mathcal{B}_{W_1}^-(\hat{f}|G) = \int_{\mathcal{T}_-} B(\hat{Y}_t) dt, \quad \text{(Eq. 27)}$$

In an embodiment, the bias determination engine 210 is configured to receive the training data set (X, Y). The bias determination engine 210 also receives the protected attributes G 202 corresponding to the instances of the input vectors X in the training data set. In the bias detection engine 210, the trained score function $\hat{f}$, generated by the ML model 150, is evaluated at the data X to produce the trained score samples of $\hat{f}(X)$. The samples of $\hat{f}(X)$ are then split up into subsets corresponding to each class G=k of the protected attribute. The samples of $\hat{f}(X)$, corresponding to G=k, are used to estimate the subpopulation CDF $F_k(t) = \mathbb{P}(\hat{f}(X) < t | G=k)$, which yields the empirical CDF $\hat{F}_k(t)$. The resulting empirical CDFs can be used to compute the model bias value, which is then used to evaluate whether the ML model 150 is biased by comparing the model bias value, computed in accordance with the Equations set forth above, to a threshold value. The threshold value is set to allow for some small amount of bias that is considered acceptable, e.g., within the regulations of the ECO A. The bias detection engine 210 can output a bias indication signal 204 to the bias explanation engine 220.

If the ML model 150 is determined to be biased, then the ML model 150 is evaluated by the bias explanation engine 220 to determine the most likely source for the bias. In other words, the bias explanation engine 220 is executed to analyze the ML model 150 to determine which predictors (e.g., input variables) contribute the most to the bias of the trained score function.

In an embodiment, the bias explanation tool 220 is configured to utilize a metric to calculate a contribution value for each group of input variables in the input vector 102. Given a subvector $X_S$, where $S = \{i_1, i_2, \ldots, i_m\}$, of the input vector $X = \{X_1, X_2, \ldots, X_p\}$ and complementary vector $X_C$, then an explainer function E can be denoted as:

$$E_S(X) := E(S; \hat{f}(X)), \quad \text{(Eq. 28)}$$

where the explainer function E provides a measure of the contribution of the subvector $X_S$ to the score value $\hat{f}(X)$. The choice of the metric can be a variety of functions, but typical implementations may utilize grouped PDP values or Shapley Additive Explanations (SHAP) values.

The grouped PDP and SHAP values can be written in the form provided by Equation 28 as follows. Given the subvector $X_S$, $S=\{i_1, i_2, \ldots, i_m\}$, of the input vector $X=\{X_1, X_2, \ldots, X_p\}$ and complementary vector $X_C$, the marginal expectation $\bar{f}_S(X_S)$ of $\hat{f}$ with respect to $X_C$, called a grouped PDP, is defined by:

$$\bar{f}_S(X_S) := \mathbb{E}[f(x_S, X_C)]|_{x_S=X_S} \approx \frac{1}{N}\sum_{i=1}^{N} f(X_S, X_C^{(i)}) \quad \text{(Eq. 29)}$$

The summation in the sum on the right-hand side is done over a certain collection of N samples from the trained data set X. The grouped PDP is a function of |S| predictors. We define a PDP based explainer to be a function of all predictors by setting it to be in the form:

$$x \to E_S^{PDP}(X) = \bar{f}_S(x_S), x \in \mathbb{R}^P \quad \text{(Eq. 30)}$$

The grouped SHAP explainer is defined by:

$$x \to E_S^{SHAP}(x): \Sigma_{j \in S} \phi_j(x), x \in \mathbb{R}^P, \quad \text{(Eq. 31)}$$

where $\{\phi_j\}_{j=1}^P$ are the SHAP values.

In one embodiment, the explainer function utilizes grouped PDP values. While there are several methods to define the explainer function E, one method defines the contribution based on the definition of model bias, set forth above in Equations 12 or 14, for example. More specifically, the bias explanation for the subvector $X_S$ is given by:

$$\beta(S, \hat{f}) = \mathcal{B}_{W_1}(E_S(X)|G) = \int_0^1 F_{E,0}^{-1}(p) - F_{E,1}^{-1}(p)|dp, \quad \text{(Eq. 32)}$$

where $F_{E,k}^{-1}$ is the quantile function of the subpopulation predictor's explainer $E_S(X)|G=k$. By design, a predictor's bias explanation disregards the sign of the bias, so the bias explanation can also be disaggregated (e.g., separated) into positive and negative parts.

The bias explanation engine 220 generates bias contribution values 206 for each group of predictors in the input vector 102, which can be ranked in the order of greatest contribution to least contribution. The bias mitigation engine 230 can take the list of bias contribution values and can use the list to determine how to mitigate the bias in the trained score function of the ML model 150. Mitigation can take a number of forms that result in a fair classifier 208.

Removing nonlinear dependencies between input variables is a non-trivial task and, in some cases, can be impossible. Given a set of predictors (e.g., a group of input variables corresponding to a subvector $X_S$) identified as contributing to the bias, a post-processed score function can be defined as:

$$\tilde{f}(X_S, X_C) = \hat{f}(C(X_S), X_C), \quad \text{(Eq. 33)}$$

where $C(X_S)$ is a certain transformation applied to the subvector $X_S$.

In one embodiment, the transformation is selected to neutralize the components of the subvector $X_S$. Neutralization refers to completely removing the effect of these components of the input vector to the score function by replacing the values of these components with a fixed value. For example, the transformation selected for neutralization can be defined as:

$$C(X_S) = \{\text{median}(X_i)\}_{i \in S} \quad \text{(Eq. 34)}$$

In other words, the values of the input variables in subvector $X_S$ are replaced by new values that are equal to the median value for those input variables taken from the training data set. The post-processed score function is the same as the trained score function, except a portion of the input vector 102 is replaced with certain constant values that are meant to mitigate bias caused by a specific subset of the input variables. In other embodiments, any other quantile value can be used within the transformation in lieu of the median value. For example, a mean value could be used instead of the median value.

Full neutralization is potentially good for mitigating bias, but it also removes a good deal of information available to the ML model 150. Therefore, in some embodiments, the bias mitigation engine 230 is configured to utilize partial neutralization as a mitigation method.

In partial neutralization, the transformation C(X) is a compressive transformation that scales each component of subvector $X_S$ by compressing values towards a target value, such as the median value of all instances of that component in the training data set. Of course, the target value can be any particular value, such as the mean value or any other value of choice. The scaling map of transformation C(X) that compresses the value towards a median value is defined as follows:

$$C_k(X_{ik}, \delta_k) = \frac{X_{ik} - \text{median}(X_{ik})}{\delta_k} + \text{median}(X_{ik}) \quad \text{(Eq. 35)}$$

It will be appreciated that the scaling coefficients $\delta_k$ can vary for each component of the subvector $X_S$, and in principle $\delta_k$ can be functions of $X_{ik}$. The choice of scaling coefficients is effectively a balance between fairness and utility. Full neutralization completely mitigates the effect of these components, but will negatively impact the effectiveness of the model. In some embodiments, the choice of scaling coefficients can be posed as a minimization problem.

An objective function L can be defined utilizing a fixed penalization parameter, as follows:

$$L(\delta) = \mathcal{B}_{W_1}(\tilde{f}_\delta|G) + \lambda \cdot (1 - \mathcal{P}(\tilde{f}_\delta)), \quad \text{(Eq. 36)}$$

where $\delta = \delta_1, \delta_2, \ldots, \delta_m$) is a vector of scaling coefficients, corresponding to a collection of grouped predictors ($X_{S_1}, X_{S_2}, \ldots, X_{S_m}$), $\tilde{f}_\delta$ is the post-processed score:

$$\tilde{f}_\delta(X) := f(C(X_S; \delta), X_C), \quad \text{(Eq. 37)}$$

$$C(X_S; \delta) = (C_1(X_{i_1}, \delta_1), C_2(X_{i_2}, \delta_2), \ldots, C_m(X_{i_m}, \delta_m)), \quad \text{(Eq. 38)}$$

where $\lambda > 0$ is a fixed penalization parameter, and $\mathcal{P}(\tilde{f}_\delta)$ measures the performance of the model based on, for example, an integrated classifier error rate or a balanced error rate. The minimization problem can then be solved by randomly sampling the space of scaling coefficients to minimize L.

Another method for mitigating bias is to construct a fair score $\bar{f}(X, G)$ based on the trained score function $\hat{f}(X)$ and then approximate the fair score to obtain a post-processed score $\tilde{f}(X)$ that only requires the predictors X as input. A score $\bar{f}(X, G)$ is called fair with respect to the protected attribute G, if a fair score $\bar{f}(X, G)$ is independent of G, which is equivalent to the requirement that the subpopulation CDFs are equal:

$$\mathbb{P}(\bar{f}(X,G) \leq t|G=g) = \mathbb{P}(\bar{f}(X,G) < t), g \in \{0,1\}, t \in \mathbb{R} \quad \text{(Eq. 39)}$$

The construction of the fair score and the two approximation techniques are discussed below. The fair score $\bar{f}(X, G)$ requires both X and G as input. The joint distribution (X, G) is only available for training data and is not available at a later time. Thus, the fair score serves only as an intermediate model. The final model, a post-processed score, is obtained by an appropriate approximation of the fair score.

In an embodiment, under a technical assumption that each subpopulation score $\hat{f}(X)|G=k$ has a continuous CDF, and the support of the distributions $\hat{f}(X)|G=k$, with $k=\{0,1\}$, are connected intersecting sets, the fair score can be defined as:

$$\tilde{f}_\lambda(X,G)=F_\lambda^{-1} \circ F_G(\hat{f}(X)), F_\lambda^{-1}(p)=F_0^{-1}(p)(1-\lambda)+F_1^{-1}(p)\lambda, \quad \text{(Eq. 40)}$$

where $\lambda \in [0,1]$ is a fixed parameter, $F_k$ is the subpopulation CDF of the trained score $\hat{f}(X)$ for each class of the protected attribute $G=k$, $$F_k(t) = \mathbb{P}(\hat{f}(X) < t | G=k), \quad \text{(Eq. 41)}$$

and $F_\lambda^{-1}$ is the quantile function defined as a linear combination of subpopulation quantile functions $F_k^{-1}$, $k=\{0,1\}$. In practice the CDF $F_k$ is replaced in Equation 40 with its empirical estimate:

$$\hat{F}_k(t) = \frac{1}{n_k} \sum_{(x,g) \in (X,G)} \mathbb{1}_{\{\hat{f}(x)<t, g=k\}}, \; n_k = \sum_{g \in G} \mathbb{1}_{\{g=k\}} \quad \text{(Eq. 42)}$$

By construction, the CDF of the fair score $\tilde{f}_\lambda(X, G)$ is the function $F_\lambda$. It is worth noting that, if $\lambda=0$, the fair score $\tilde{f}_0(X, G)$ has the distribution that coincides with that of the unprotected class, and if $\lambda=1$, with that of the protected class.

In another embodiment, the fair score is constructed as follows:

$$\tilde{f}_M(X,G) = F_M^{-1} \circ F_G(\hat{f}(X)), F_M^{-1}(u) = \text{median}_{k \in \{0,1\}} F_k^{-1}(u) \quad \text{(Eq. 43)}$$

Here, as in Equation 40, $F_k$ are the subpopulation CDFs, while $F_M$ is the CDF of the median distribution of subpopulation distributions $\hat{f}(X)|G=k$. By construction, the CDF of the fair score $\tilde{f}_M(X, G)$ is the function $F_M$. As above, in practice, the CDFs $F_k$ are replaced with their empirical estimates.

In another embodiment, a fair score is approximated as follows. Given a fair score $\tilde{f}(X, G)$, a new score $\tilde{f}$ is constructed that depends only on predictors X by projecting the fair score $\tilde{f}(X, G)$, viewed as a random variable, onto the space of predictors $H_X = L^2(\Omega, \sigma(X_S), \mathbb{P})$, where $X_S$, with $S=\{i_1, i_2, \ldots, i_m\}$, is a grouped predictor containing the most biased predictors utilized in the mitigation procedure. The post-processed score $\tilde{f}$ is given by the conditional expectation:

$$\tilde{f}(X) = \mathbb{E}[\tilde{f}(X,G)|X_S] = \Sigma_{k=0}^1 \tilde{f}(X,k) \mathbb{P}(G=k|X_S) \quad \text{(Eq. 44)}$$

The post-processed score $\tilde{f}$ does not require G as input, and relies on the regressors $\mathbb{P}(G=k|X_S)$, which are trained once using the training data set (X, G).

In another embodiment, the mitigation method approximates a fair score by constructing a post-processed score that yields classifiers with population dependent thresholds.

In order to mitigate bias, a quantile function is constructed:

$$F_{X_S}^{-1}(t) = \Sigma_{k=0}^1 F_k^{-1}(q) \mathbb{P}(G=k|X_S) \quad \text{(Eq. 45)}$$

which depends on $X_S$, and then a corresponding CDF $F_{X_S}(t)$ is constructed. A post-processed score defined by:

$$\tilde{f}(X) = F_\lambda^{-1} \circ F_{X_S} \circ \hat{f}(X) \quad \text{(Eq. 46)}$$

where $F_\lambda^{-1}(q) = \lambda F_0^{-1}(q) + (1-\lambda) F_1^{-1}(q)$. The post-processed score yields the classifiers with subpopulation dependent thresholds. In practice, all CDFs and quantile functions are replaced with their empirical estimates.

Figure 3:
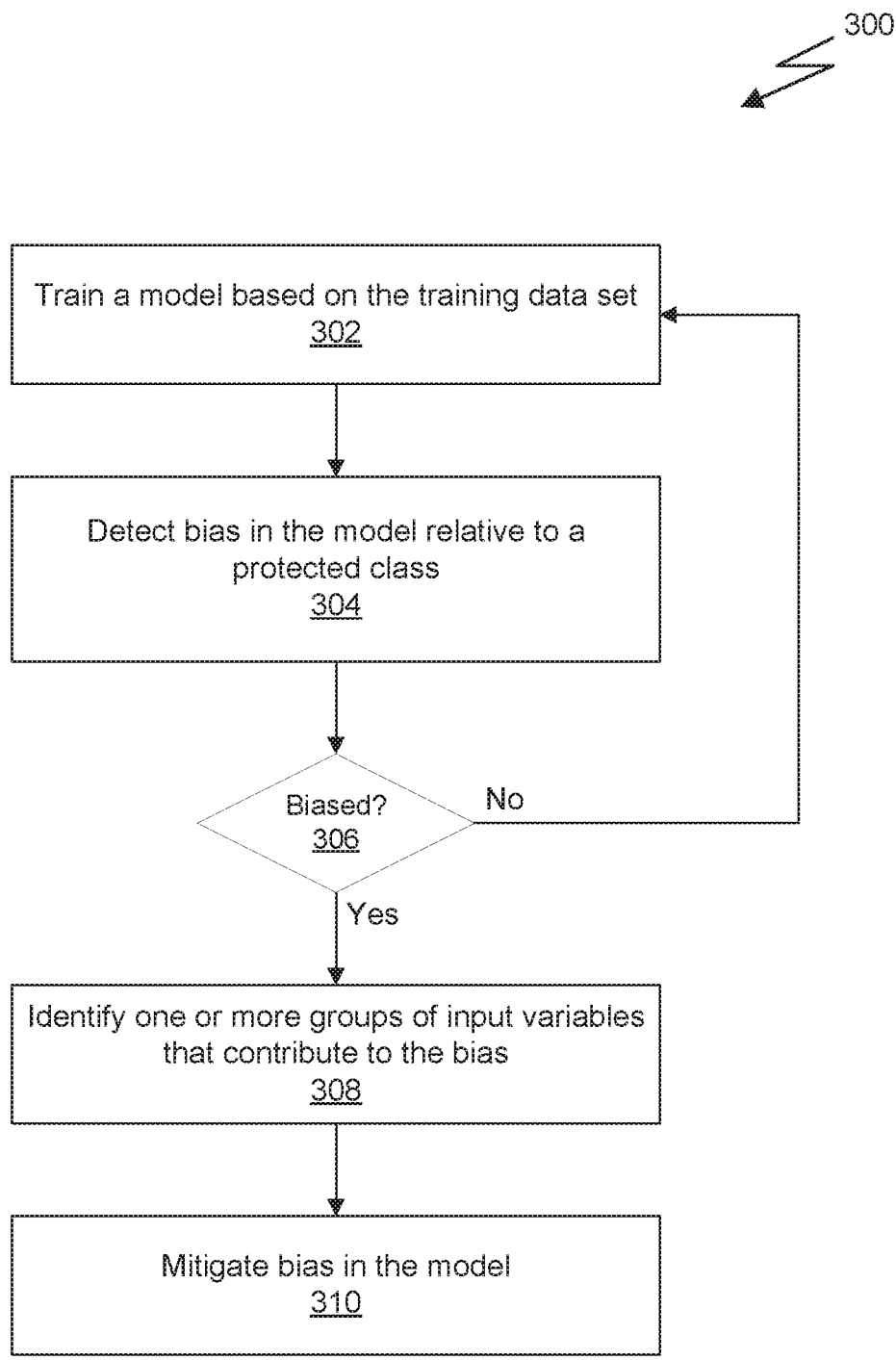
FIG. 3 is a flowchart of a method for managing bias in a trained classification score, in accordance with some embodiments.

FIG. 3 is a flowchart of a method 300 for managing bias in a trained classifier, in accordance with some embodiments. It will be appreciated that the method 300 is described in the context of a processor executing instructions that cause the processor to perform, at least in part, one or more of the steps of the method 300. However, in other embodiments, the method 300 can be performed by hardware or software, or any combination of hardware or software, including the use of a central processing unit (CPU), a graphics processing unit (GPU), a parallel processing unit (PPU), one or more server devices configured to implement a service, or the like.

At step 302, a model is trained based on a training data set. In an embodiment, a training data set is received that includes a number of instances of an input vector, where each input vector is paired with a corresponding target output vector. The model is initialized and each instance of the input vector is processed by the model to generate an output vector. A loss function is calculated based on the difference between the target output vector and the output vector, and the result of the loss function is used to adjust the parameters of the model. Over a number of iterations with different input vectors, the parameters of the model converge to minimize the loss function across the set of input vectors included in the training data set.

At step 304, the model is evaluated to detect bias in the model relative to a protected class. In one embodiment, a number of instances of the input vector are selected from the training data set. The selected input vectors are processed by the trained model to generate an output vector corresponding to each input vector. Each input vector is also paired with a protected attribute that can be collected from a source separate from the training data set or inferred based on information included in the training data set (e.g., using BISG). The data (X, G) is used to compute the samples of the trained score $\hat{f}(X)|G=k$ for each particular class of the protected attribute G. In one embodiment, the distributions of the subpopulation scores $\hat{f}(X)|G=k$ for each class of the protected attribute $G=k$ are compared using a metric that measures the differences between the distributions. In an embodiment, the metric is a Wasserstein distance metric.

At step 306, a comparison of the metric value with a threshold value determines whether the model is biased. In an embodiment, a threshold value is set that determines if the amount of bias against a protected class is more than an acceptable level. If the metric value is not above the threshold value, then the model is classified as fair and the method 300 can return to step 302 to analyze another trained model. However, if the metric value is above the threshold value, then the method 300 proceeds to step 308.

At step 308, one or more groups of input variables are identified that contribute to the bias of the model. In an embodiment, a clustering algorithm is used to divide the input variables in the input vector into groups. The clustering algorithm can be based on correlation between variables such that the input variables within a group are more strongly correlated with other variables in the group than any variables in other groups. Once the groups of input variables are identified, a bias contribution value is calculated for each group of input variables. In one embodiment, the bias contribution value is related to a grouped PDP metric. In another embodiment, the bias contribution value is related to a SHAP metric.

At step 310, bias in the model is mitigated. In an embodiment, bias is mitigated using a post-processed score function to at least partially neutralize a subset of input variables in the input vector. In another embodiment, bias is mitigated by constructing a fair score approximation for the model.

Figure 4:
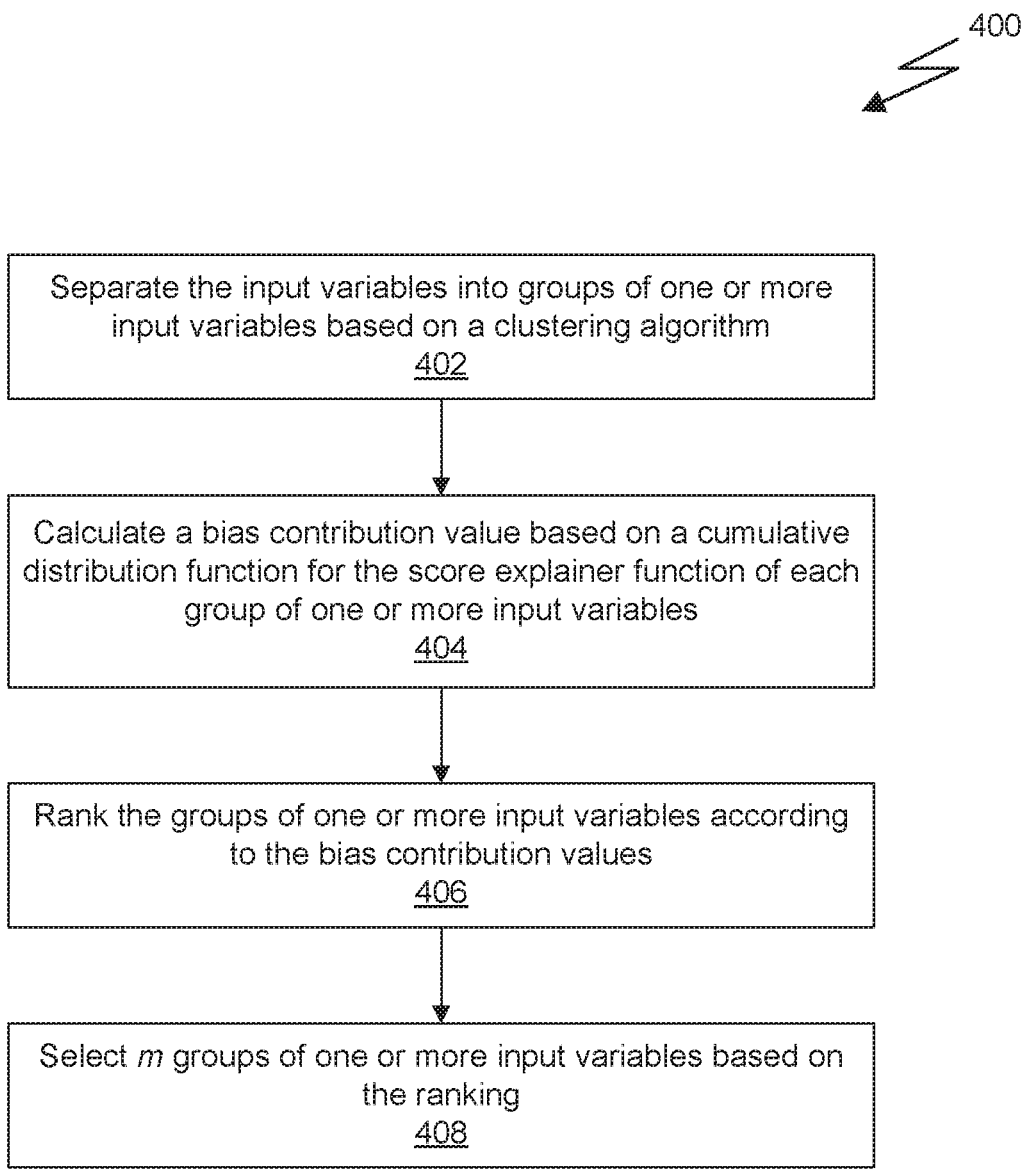
FIG. 4 is a flowchart of a method for explaining bias in a trained classification score, in accordance with some embodiments.

FIG. 4 is a flowchart of a method 400 for explaining bias in a trained model, in accordance with some embodiments. It will be appreciated that the method 400 is described in the context of a processor executing instructions that cause the processor to perform, at least in part, one or more of the steps of the method 400. However, in other embodiments, the method 400 can be performed by hardware or software, or any combination of hardware or software, including the use of a central processing unit (CPU), a graphics processing unit (GPU), a parallel processing unit (PPU), one or more server devices configured to implement a service, or the like. In an embodiment, the method 400 can be implemented as part of step 308 of the method 300.

At step 402, the input variables are separated into groups of one or more input variables based on a clustering algorithm. In an embodiment, the clustering algorithm is a PROC VARCLUS clustering algorithm developed by SAS® and is closely related to principal component analysis (PCA). A covariance matrix for the input variables of the input vector is developed, based on an analysis of the training data set. Initially, all input variables are assigned to a single group. Primary eigenvectors of the covariance matrix are used to split the input variables in the group into two groups. The process is repeated recursively for each group until all groups include only a single input variable. The tree structure formed based on the recursive splitting is then used to construct groups of input variables where two groups are combined into a single group if the correlation between variables in the groups is above a threshold. Other techniques for forming the groups, such as by manual analysis of the tree structure, can be employed.

At step 404, a bias contribution value is calculated for each group of input variables. The bias contribution value is based on a quantile function related to a metric such as a grouped PDP metric or a SHAP metric. In an embodiment, the bias contribution value is based on a cumulative distribution function (CDF) for the score explainer function of each group of one or more input variables.

At step 406, the groups of input variables are ranked according to the bias contribution values. At step 408, m groups of input variables are selected based on the ranking. In an embodiment, a small number (e.g., 3) of groups of input variables having the highest bias contribution values are selected as contributing the most to the bias of the classifier. In another embodiment, all groups having a bias contribution value above a threshold value are selected as contributing significantly to the bias of the model.

Figure 5:
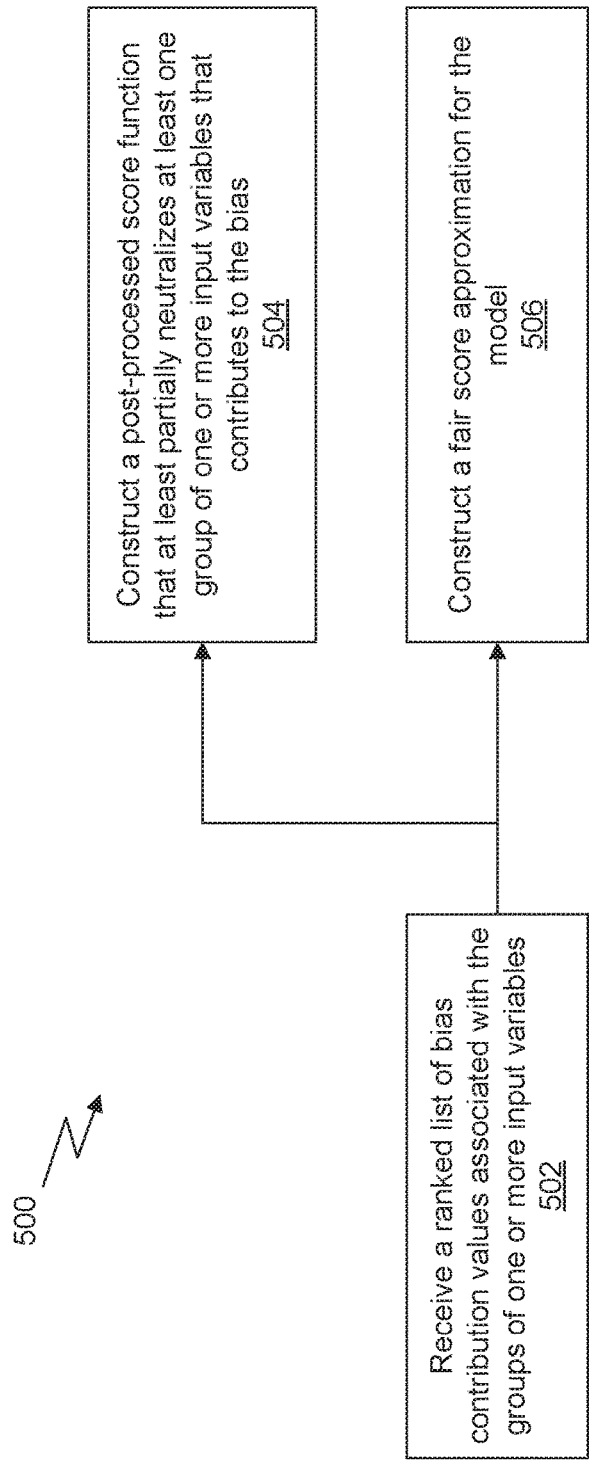
FIG. 5 is a flowchart of a method for mitigating bias in a trained classification score, in accordance with some embodiments.

FIG. 5 is a flowchart of a method 500 for mitigating bias in a trained model score, in accordance with some embodiments. It will be appreciated that the method 500 is described in the context of a processor executing instructions that cause the processor to perform, at least in part, one or more of the steps of the method 500. However, in other embodiments, the method 500 can be performed by hardware or software, or any combination of hardware or software, including the use of a central processing unit (CPU), a graphics processing unit (GPU), a parallel processing unit (PPU), one or more server devices configured to implement a service, or the like. In an embodiment, the method 500 can be implemented as part of step 310 of the method 300.

At step 502, a list of bias contribution values associated with the groups of one or more input variables is received. In an embodiment, the list is ranked from largest bias contribution value to smallest bias contribution value. The ranked list can be utilized to pick one or more groups of input variables for which the bias is mitigated.

The bias can be mitigated using one or more different techniques, either alone or in combination. At step 504, a post-processed score function is constructed. The post-processed score function at least partially neutralizes at least one group of input variables that contributes to the bias. In one embodiment, input variables in each group of the at least one group of input variables are neutralized by replacing each input variable in the input vector with a corresponding value for that input variable. In one embodiment, the corresponding value is a median value for the input variable from the set of instances of the input vector included in the training data set. In another embodiment, the corresponding value is a mean value for the input variable from the set of instances of the input vector included in the training data set. In yet another embodiment, the corresponding value is a value of zero. In yet another embodiment, the corresponding value is any other value that is derived from the training data set.

At step 506, which can be performed before or after step 504 or in lieu of step 504, a fair score approximation for the model is constructed. In an embodiment, the fair score is generated based on the joint distribution of the input vector and the protected attribute, and then approximated either by score projection or the projection of the decision boundary. In an embodiment, the fair score approximation transforms the distributions of the protected class and/or the unprotected class to make the transformed distributions substantially similar.

Figure 6:
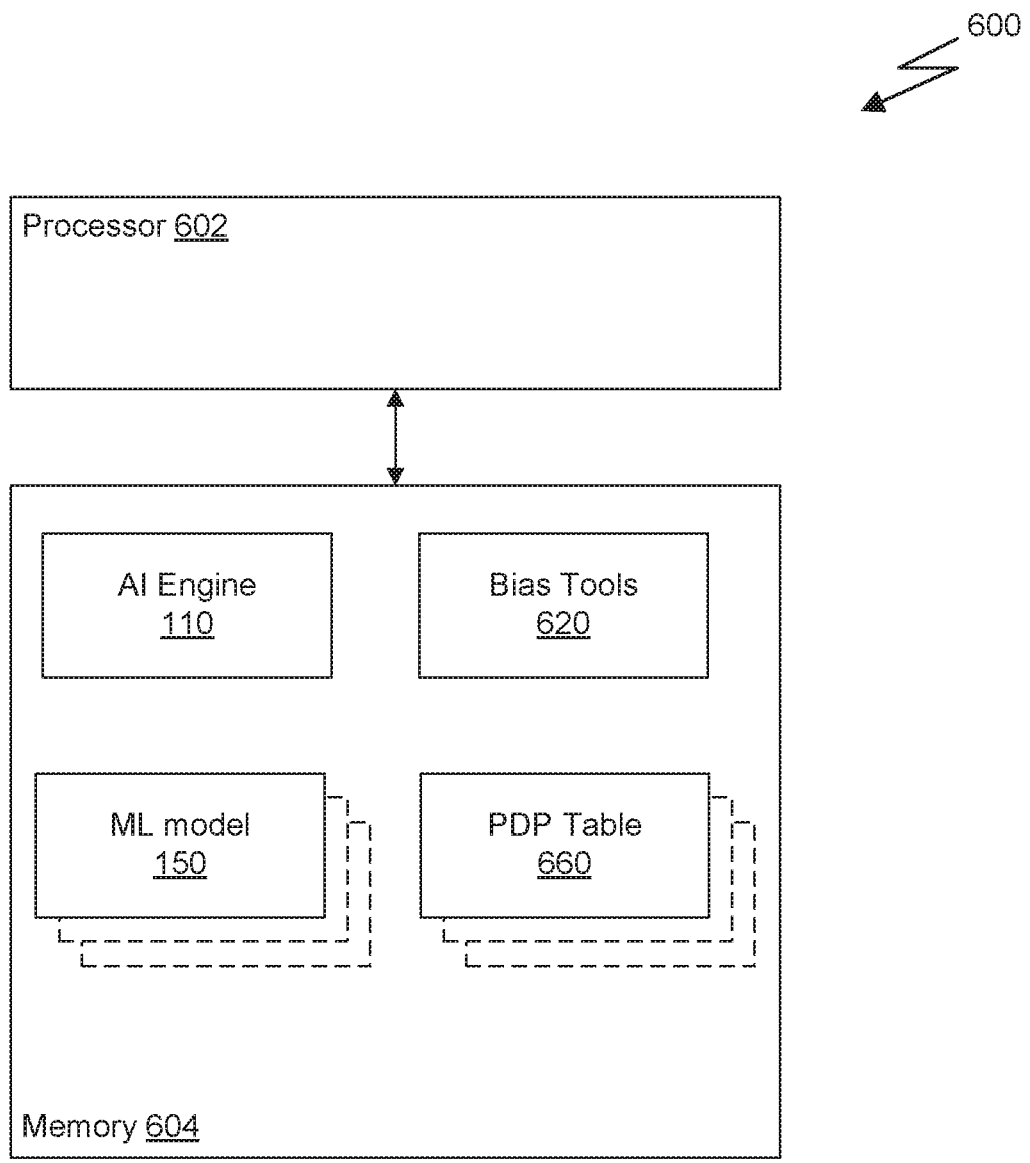
FIG. 6 illustrates an exemplary computer system configured to mitigate bias in a machine learning model, in accordance with some embodiments.

FIG. 6 illustrates an exemplary computer system 600 configured to mitigate bias in unfair classifiers, in accordance with some embodiments. The computer system 600 includes a processor 602 and a memory 604. In an embodiment, the processor 602 is a central processing unit (CPU) that is configured to execute a set of instructions for the AI engine 110, stored in the memory 604. The AI engine 110 includes instructions that facilitate the processor 602 to train a ML model based on a training data set. The AI engine 110 can be configured to load a ML model 150 from the memory 604, execute instructions included in the ML model 150 to process the input vector, and generate an output vector.

In some embodiments, PDP tables 660 can be generated and stored in the memory 604 by the AI engine 110 at the same time or subsequent to the training of the ML model 150 based on the training data set. In one embodiment, each ML model 150 is associated with two or more PDP tables 660, each PDP table corresponding to a different group of input variables in the corresponding input vector. The PDP tables 660 can then be utilized by the bias explanation engine 220 to determine which groups of input variables contribute the most to the detected bias. It will be appreciated that, when other metrics are used by the bias explanation engine 220, that the PDP tables 660 may be replaced with other data structures used in a different algorithm corresponding to the different metric.

In some embodiments, the processor 602 is a parallel processing unit (PPU). Certain ML models 150 can be optimized to run in parallel. For example, Convolutional Neural Networks (CNNs) can involve the processing of convolution operations corresponding to different subsets of the input vector (e.g., images) in parallel. In addition, certain ML models 150 can benefit by parallel training techniques, such as batch training that divides the set of training data into small batches and processes each batch of training data via different instances of the ML model 150 in parallel. The output vectors are then processed by a loss function across all of the batches to generate updated parameters for the ML model 150.

In some embodiments, the system 600 can include two or more processors 602, such as a CPU and a PPU (e.g., graphics processing unit—GPU). In other embodiments, the processor 602 can be implemented as a system on a chip (SoC) that includes one or more CPU cores and one or more GPU cores. In yet other embodiments, the system 600 can be implemented as a server device. A client device can transmit a request to the server device including the input vector and the server device can process the input vector and transmit the output vector back to the client device. It will be appreciated that any computer system including one or more processors 602 and one or more memories 604 that is configured to perform the functions described herein is contemplated as being within the scope of this disclosure.

Figure 7:
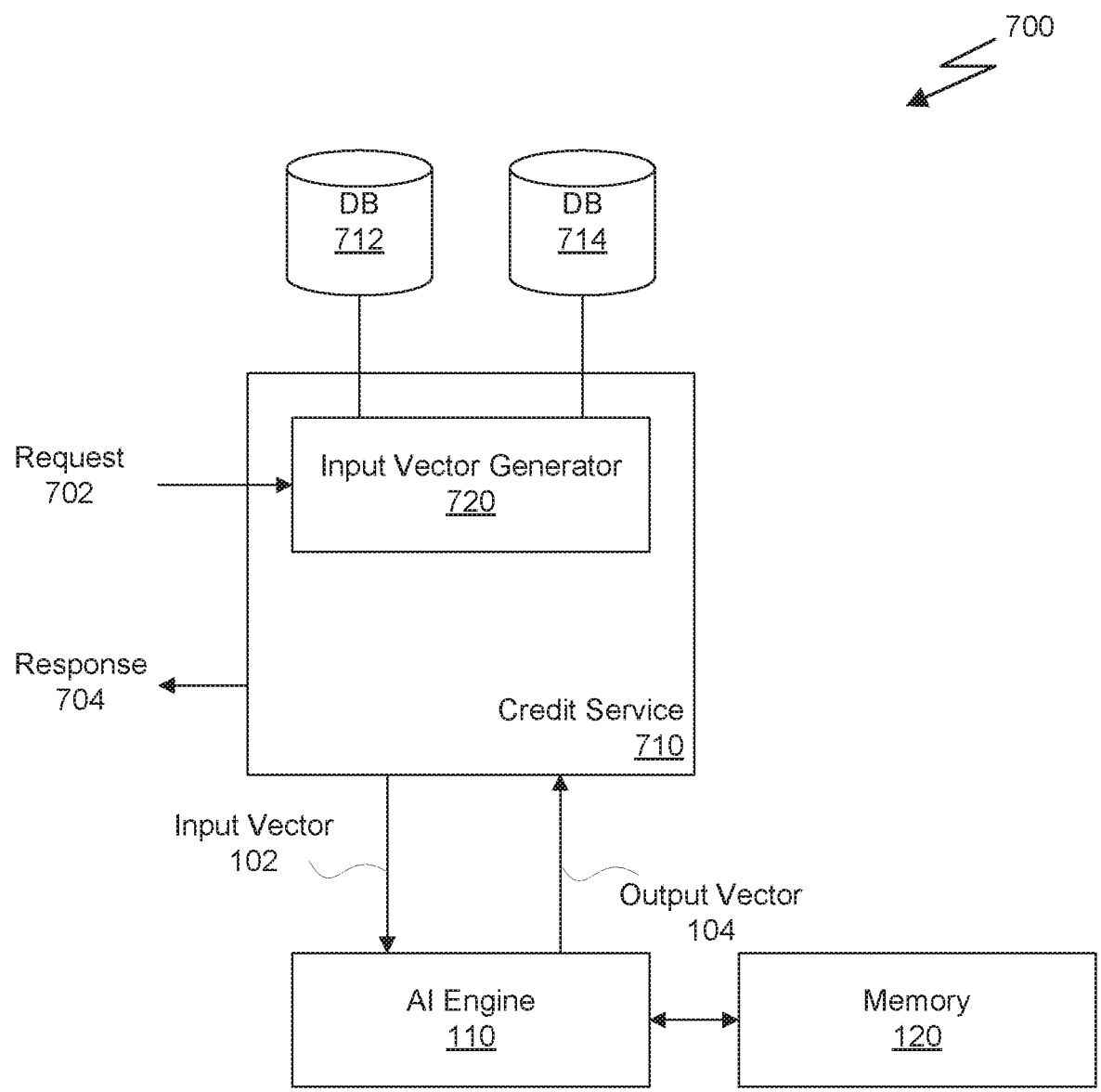
FIG. 7 illustrates a system for utilizing the ML model, in accordance with some embodiments.

FIG. 7 illustrates a system 700 for utilizing the ML model, in accordance with some embodiments. The system 700 is an example of how mitigation of bias can be utilized within a particular field. Again, financial services companies that offer certain products or services must adhere to the Equal Credit Opportunity Act (ECOA), which mandates that firms engaged in extending credit must do so without regard to certain aspects of the applicant, such as sex, gender, or age. The AI engine 110 of FIG. 1 can be employed to aid in this process.

As depicted in FIG. 7, a credit service 710 includes an input vector generator 720 implemented by a server device. The input vector generator 720 is configured to receive a request 702 to determine whether to extend credit to an applicant. The request 702 may include information that identifies the applicant, such as a name of the applicant, a social security number (SSN) of the applicant, or the like. The input vector generator 720 can then access various databases 712, 714 to collect information about the applicant. For example, the database 712 can be related to credit history such as a credit score for the applicant compiled by one or more credit rating agencies. The database 714 can be related to other financial products offered by the financial services corporation, such as a loan history for an auto loan or mortgage that the applicant has opened with the financial services corporation. The various information from one or more sources are collected by the input vector generator 710 and compiled into an input vector 102.

The input vector 102 is transmitted to the AI engine 110, which processes the input vector 102 via an ML model 150 stored in the memory 120 to generate an output vector 104. It will be appreciated that the ML model 150 can be adapted to mitigate bias using one of the techniques discussed above. In one embodiment, the output vector 104 can be a binary value that indicates whether the application to extend credit to the applicant is denied or accepted.

The credit service 710 receives the output vector 104 and determines whether the application is accepted or denied. If the applicant is denied credit (e.g., an adverse decision), then the credit service 710 can be configured to send a response 704 to a client device or a different server device that indicates whether the credit application was accepted or denied. The notification message can be transmitted to a client device over a network (e.g., sent to a web browser of a client device as part of a web service hosted by the financial services corporation that facilitates customers submitting credit applications), sent via an email messaging protocol, sent via text message (e.g., SMS), or any other type of electronic communications medium.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on"

and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method carried out by a computing system comprising one or more processors and at least one non-transitory computer-readable medium, the method comprising:
   training a machine learning model by carrying out a machine learning process on a training data set, wherein the trained machine learning model is configured to (i) receive an input vector comprising respective values for a given set of input variables and (ii) based on an evaluation of the received input vector, output a score for use in rendering a given type of classification decision;
   detecting bias in the trained machine learning model relative to a protected class by (i) inputting a first set of input vectors associated with an unprotected class into the trained machine learning model and thereby producing a first set of scores associated with the unprotected class (ii) inputting a second set of input vectors associated with the protected class into the trained machine learning model and thereby producing a second set of scores associated with the protected class, (iii) performing a comparison between the first set of scores and the second set of scores, and (iv) based on the comparison, determining that the trained machine learning model exhibits a threshold level of bias;
   in response to determining that the trained machine learning model exhibits a threshold level of bias, identifying one or more input variable groups that contribute to the bias by (i) dividing the trained machine learning model's given set of input variables into a plurality of input variable groups, wherein each respective input variable group includes a respective subset of the given set of input variables, (ii) determining respective bias contribution values for the plurality of input variable groups using a score explainer function, and (iii) based on the respective bias contribution values that are determined for the plurality of input variable groups, identifying the one or more input variable groups that contribute to the bias;
   mitigating bias in the trained machine learning model by producing a post-processed version of the trained machine learning model that comprises a respective transformation in place of each of the identified one or more input variable groups, wherein the post-processed version of the trained machine learning model is configured to (i) receive an input vector comprising respective values for a given set of input variables, (ii) for each of the identified one or more input variable groups, apply the respective transformation to the respective value for the input variable group, and (iii) based on an evaluation of the transformed input vector, output a score for use in rendering the given type of classification decision; and
   using the post-processed version of the trained machine learning model to render the given type of classification decision for a given input vector by (i) executing the post-processed version of the trained machine learning model, (ii) while executing the post-processed version of the trained machine learning model, inputting the given input vector into the post-processed version of the trained machine learning model and thereby causing the post-processed version of the trained machine learning model to output a given score for the given input vector, and (iii) comparing the given score to a classification threshold for the given type of classification decision.

2. The method of claim 1, wherein performing the comparison between the first set of scores and the second set of scores comprises:
   comparing distributions of the first and second sets of scores based on a Wasserstein distance metric.

3. The method of claim 1, wherein the bias is separated into a positive bias and a negative bias.

4. The method of claim 1, wherein dividing the trained machine learning model's given set of input variables into the plurality of input variable groups comprises:
   dividing the trained machine learning model's given set of input variables into the plurality of input variable groups based on a clustering algorithm.

5. The method of claim 1, wherein the respective bias contribution values for the plurality of input variable groups are based on group partial dependence plot (PDP) metrics.

6. The method of claim 1, wherein the respective bias contribution values for the plurality of input variable groups are based on Shapley Additive Explanation (SNAP) metrics.

7. The method of claim 1, wherein the respective transformation for at least one respective input variable group of the identified one or more input variable groups functions to at least partially neutralize the respective input variable group.

8. The method of claim 1, wherein the respective transformation for at least one respective input variable group of the identified one or more input variable groups functions to compress each input variable in the respective input variable group.

9. The method of claim 8, wherein the respective transformation for the at least one respective input variable group functions to compress the distribution of each input variable in the respective input variable group towards a median value for the input variable.

10. A computing system comprising:
    at least one non-transitory computer-readable medium;
    one or more processors; and
    program instructions stored on the at least one non-transitory computer-readable medium that are executable by the one or more processors such that the computing system is configured to:
       train a machine learning model by carrying out a machine learning process on a training data set, wherein the trained machine learning model is configured to (i) receive an input vector comprising respective values for a given set of input variables and (ii) based on an evaluation of the received input vector, output a score for use in rendering a given type of classification decision;
       detect bias in the trained machine learning model relative to a protected class by (i) inputting a first set of input vectors associated with an unprotected class into the trained machine learning model and thereby producing a first set of scores associated with the unprotected class (ii) inputting a second set of input vectors associated with the protected class into the trained machine learning model and thereby producing a second set of scores associated with the protected class, (iii) performing a comparison between the first set of scores and the second set of scores, and (iv) based on the comparison, determining that the trained machine learning model exhibits a threshold level of bias;

in response to determining that the trained machine learning model exhibits a threshold level of bias, identify one or more input variable groups that contribute to the bias by (i) dividing the trained machine learning model's given set of input variables into a plurality of input variable groups, wherein each respective input variable group includes a respective subset of the given set of input variables, (ii) determining respective bias contribution values for the plurality of input variable groups using a score explainer function, and (iii) based on the respective bias contribution values that are determined for the plurality of input variable groups, identifying the one or more input variable groups that contribute to the bias;

mitigate bias in the trained machine learning model by producing a post-processed version of the trained machine learning model that comprises a respective transformation in place of each of the identified one or more input variable groups, wherein the post-processed version of the trained machine learning model is configured to (i) receive an input vector comprising respective values for a given set of input variables, (ii) for each of the identified one or more input variable groups, apply the respective transformation to the respective value for the input variable group, and (iii) based on an evaluation of the transformed input vector, output a score for use in rendering the given type of classification decision; and use the post-processed version of the trained machine learning model to render the given type of classification decision for a given input vector by (i) executing the post-processed version of the trained machine learning model, (ii) while executing the post-processed version of the trained machine learning model, inputting the given input vector into the post-processed version of the trained machine learning model and thereby causing the post-processed version of the trained machine learning model to output a given score for the given input vector, and (iii) comparing the given score to a classification threshold for the given type of classification decision.

11. The computing system of claim 10, wherein performing the comparison between the first set of scores and the second set of scores comprises:

comparing distributions of the first and second sets of scores based on a Wasserstein distance metric.

12. The computing system of claim 10, wherein dividing the trained machine learning model's given set of input variables into the plurality of input variable groups comprises:

dividing the trained machine learning model's given set of input variables into the plurality of input variable groups based on a clustering algorithm.

13. The computing system of claim 10, wherein the respective bias contribution values for the plurality of input variable groups are based on group partial dependence plot (PDP) metrics.

14. The computing system of claim 10, wherein the respective transformation for at least one respective input variable group of the identified one or more input variable groups at least partially neutralizes the respective input variable group.

15. A non-transitory computer-readable media storing computer instructions that, when executed by one or more processors, cause a computer system to perform functions comprising:

training a machine learning model by carrying out a machine learning process on a training data set, wherein the trained machine learning model is configured to (i) receive an input vector comprising respective values for a given set of input variables and (ii) based on an evaluation of the received input vector, output a score for use in rendering a given type of classification decision;

detecting bias in the trained machine learning model relative to a protected class by (i) inputting a first set of input vectors associated with an unprotected class into the trained machine learning model and thereby producing a first set of scores associated with the unprotected class (ii) inputting a second set of input vectors associated with the protected class into the trained machine learning model and thereby producing a second set of scores associated with the protected class, (iii) performing a comparison between the first set of scores and the second set of scores, and (iv) based on the comparison, determining that the trained machine learning model exhibits a threshold level of bias;

in response to determining that the trained machine learning model exhibits a threshold level of bias, identifying one or more input variable groups that contribute to the bias by (i) dividing the trained machine learning model's given set of input variables into a plurality of input variable groups, wherein each respective input variable group includes a respective subset of the given set of input variables, (ii) determining respective bias contribution values for the plurality of input variable groups using a score explainer function, and (iii) based on the respective bias contribution values that are determined for the plurality of input variable groups, identifying the one or more input variable groups that contribute to the bias;

mitigating bias in the trained machine learning model by producing a post-processed version of the trained machine learning model that comprises a respective transformation in place of each of the identified one or more input variable groups, wherein the post-processed version of the trained machine learning model is configured to (i) receive an input vector comprising respective values for a given set of input variables, (ii) for each of the identified one or more input variable groups, apply the respective transformation to the respective value for the input variable group, and (iii) based on an evaluation of the transformed input vector, output a score for use in rendering the given type of classification decision; and using the post-processed version of the trained machine learning model to render the given type of classification decision for a given input vector by (i) executing the post-processed version of the trained machine learning model, (ii) while executing the post-processed version of the trained machine learning model, inputting the given input vector into the post-processed version of the trained machine learning model and thereby causing the post-processed version of the trained machine learning model to output a given score for the given input vector, and (iii) comparing the given score to a classification threshold for the given type of classification decision.

16. The method of claim 1, wherein the given type of classification decision comprises a type of classification decision that is subject to review under the Equal Credit Opportunity Act (ECOA).

17. The computing system of claim 10, wherein the respective bias contribution values for the plurality of input variable groups are based on Shapley Additive Explanation (SHAP) metrics.

18. The computing system of claim 10, wherein the respective transformation for at least one respective input variable group of the identified one or more input variable groups functions to compress each input variable in the respective input variable group.

19. The computing system of claim 10, wherein the given type of classification decision comprises a type of classification decision that is subject to review under the Equal Credit Opportunity Act (ECOA).

20. The computing system of claim 10, wherein the respective bias contribution values for the plurality of input variable groups comprise values that separately quantify positive bias and negative bias.

* * * * *